(12) United States Patent
Kim et al.

(10) Patent No.: US 12,269,738 B2
(45) Date of Patent: Apr. 8, 2025

(54) STANDALONE PRECURSOR FOR SYNTHESIZING NANOMATERIALS AND APPARATUS FOR SYNTHESIZING NANOMATERIALS USING THE SAME

(71) Applicant: Naieel Technology Inc., Daejeon (KR)

(72) Inventors: Jae Woo Kim, Daejeon (KR); Eun Kwang Park, Daejeon (KR); Jae Hoon Kim, Changwon-si (KR); Ji Seung Kim, Daejeon (KR); Tae Hyun Jung, Daejeon (KR)

(73) Assignee: NAIEEL TECHNOLOGY INC., Daejeon (KR)

( * ) Notice: Subject to any disclaimer, the term of this patent is extended or adjusted under 35 U.S.C. 154(b) by 54 days.

(21) Appl. No.: 17/470,314

(22) Filed: Sep. 9, 2021

(65) Prior Publication Data

US 2022/0162069 A1    May 26, 2022

(30) Foreign Application Priority Data

Nov. 20, 2020  (KR) .................. 10-2020-0157033
Jul. 14, 2021  (KR) .................. 10-2021-0091993

(51) Int. Cl.
 *C01B 21/064*    (2006.01)
 *B01J 4/00*      (2006.01)
 (Continued)

(52) U.S. Cl.
 CPC .......... *C01B 21/0641* (2013.01); *B01J 4/007* (2013.01); *B01J 19/18* (2013.01);
 (Continued)

(58) Field of Classification Search
 CPC ....... C01B 21/0641; B01J 4/007; B01J 19/18; B01J 2204/002; B82Y 30/00; B82Y 40/00; C01P 2002/10
 See application file for complete search history.

(56) References Cited

U.S. PATENT DOCUMENTS

| 9,764,539 B2 * | 9/2017 | Dean ............. B29D 99/0089 |
| 2006/0185591 A1 * | 8/2006 | Muralidharan ....... C23C 16/342 427/248.1 |

(Continued)

FOREIGN PATENT DOCUMENTS

| JP | 2018100781 A | * | 6/2018 |
| KR | 10-20140071551 A | | 6/2014 |

(Continued)

OTHER PUBLICATIONS

Kim et al. Materials 2014, 7, 5789-5801 (Year: 2014).*

(Continued)

*Primary Examiner* — Michael Forrest
*Assistant Examiner* — Jordan W Taylor
(74) *Attorney, Agent, or Firm* — Wenderoth, Lind & Ponack, L.L.P.

(57) ABSTRACT

A standalone precursor is for synthesizing nanomaterials such as boron nitride nanotubes. The standalone precursor includes a pillar. Pores and through-holes are defined in the pillar. Each of the through-holes extends continuously from a first opening on an outer surface of the standalone precursor to a second opening on the outer surface of the standalone precursor. The first opening is diametrically opposite to the second opening across the standalone precursor.

12 Claims, 16 Drawing Sheets

(51) Int. Cl.
  *B01J 19/18* (2006.01)
  *B82Y 30/00* (2011.01)
  *B82Y 40/00* (2011.01)

(52) U.S. Cl.
  CPC .......... *B01J 2204/002* (2013.01); *B82Y 30/00* (2013.01); *B82Y 40/00* (2013.01); *C01P 2002/10* (2013.01)

(56) References Cited

U.S. PATENT DOCUMENTS

2010/0192535 A1* 8/2010 Smith ................. C04B 35/6229
  428/366
2018/0215625 A1* 8/2018 Zo ......................... C01B 35/146

FOREIGN PATENT DOCUMENTS

| KR | 10-2018-0090222 A | 8/2018 |
| KR | 10-2019-0035662 A | 4/2019 |
| WO | 2017091815 A1 | 6/2017 |
| WO | 2020097688 A1 | 5/2020 |

OTHER PUBLICATIONS

Adachi et al. JP2018100781A English Translation (Year: 2018).*
Marchesini et al. ACS Nano 2017, 11, 10003-1001 (Year: 2017).*
Japanese Office Action corresponding to Application No. 2021-553770 dated Mar. 13, 2023, 2 pages.

* cited by examiner (A)

(B)

STANDALONE PRECURSOR FOR SYNTHESIZING NANOMATERIALS AND APPARATUS FOR SYNTHESIZING NANOMATERIALS USING THE SAME

CROSS-REFERENCE TO RELATED APPLICATIONS

This application claims the benefit of the filing date of Korean Patent Application No. 10-2020-0157033 filed with the Korean Intellectual Property Office on Nov. 20, 2020, and Korean Patent Application No. 10-2021-0091993 filed with the Korean Intellectual Property Office on Jul. 14, 2021, the entire contents of which are incorporated herein.

BACKGROUND

1. Technical Field

The present disclosure generally relates to a standalone precursor for synthesizing nanomaterials and an apparatus for synthesizing nanomaterials using the same, and more particularly, to a standalone precursor for synthesizing nanomaterials, capable of effectively mass-producing nanomaterials, and an apparatus for synthesizing nanomaterials using the same.

2. Description of the Related Art

Nanoscale materials attract attention in various industrial fields including an electronic industrial field due to various excellent characteristics thereof, but are difficult to practically and industrially apply due to a limitation of a process of mass-producing high-quality nanomaterials.

Among various nanoscale materials, especially boron nitride nanotubes (BNNTs) have mechanical properties and thermal conductivity similar to those of generally known carbon nanotubes (CNTs), but are excellent in electrical insulation, heat resistance, and chemical stability. Boron of which the BNNT is composed is a material useful as a neutron shield material because thermal neutron absorbency thereof is 200,000 times higher than that of carbon of which the CNT is composed.

However, the BNNTs need to be synthesized at a high temperature of 1000° C. or higher. Due to this difficult process, the BNNTs are not easy to mass-produce all over the world. This situation is not limited to the BNNTs, and there is a need to develop high-quality mass-production technology for other nanomaterials.

SUMMARY

An objective of the present disclosure is to a standalone precursor for synthesizing nanomaterials capable of efficiently mass-producing nanomaterials, and an apparatus for synthesizing nanomaterials using the same.

However, the problem to be solved by the present disclosure is not limited to the above, and the other problems not mentioned herein will be clearly understood to those skilled in the art from the following present disclosure.

An embodiment of the present disclosure provides a standalone precursor for synthesizing nanomaterials, which has a post shape and a porous structure.

Further, another embodiment of the present disclosure provides an apparatus for synthesizing nanomaterials, which includes: a receiver that receives one or more the standalone precursors for synthesizing nanomaterials; a chamber that receives the precursor received in the receiver, and includes a reaction zone that forms the nanomaterials in the precursor; and a feeder that is connected to the receiver and the chamber and receives the precursor from the receiver and feeds the precursor into the chamber, wherein the feeder feeds the precursor into the chamber along a length of the chamber.

The standalone precursor for synthesizing nanomaterials according to an embodiment of the present disclosure is directly put into the apparatus for synthesizing nanomaterials without a reaction module mounting the precursor, which makes it possible to improve process efficiency.

Further, the standalone precursor for synthesizing nanomaterials according to an embodiment of the present disclosure can effectively synthesize the nanomaterials.

Further, the apparatus for synthesizing nanomaterials according to an embodiment of the present disclosure can mass-produce nanomaterials, reduce a production time thereof, and have a high output.

Further, the apparatus for synthesizing nanomaterials according to an embodiment of the present disclosure can stably synthesize the nanomaterials.

Further, the apparatus for synthesizing nanomaterials according to an embodiment of the present disclosure can improve operation efficiency thereof to reduce a feed rate of gas required for a process of feeding the standalone precursor for synthesizing nanomaterials and a process of discharging synthesized nanomaterials.

The effects of the present disclosure are not limited to the above effects, and the other effects not mentioned herein will be clearly understood by those skilled in the art from the present specification and the accompanying drawings.

DETAILED DESCRIPTION OF THE EMBODIMENTS

Figure 1A:
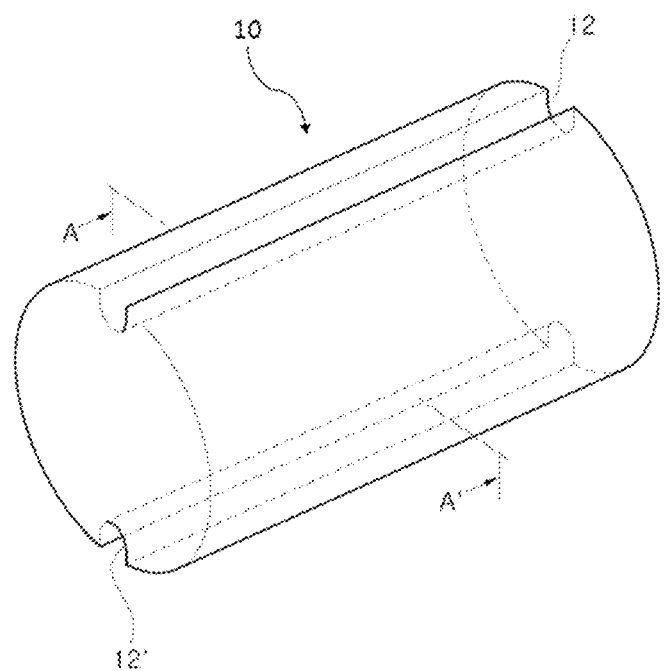
FIGS. 1A and 1B are views illustrating a standalone precursor for synthesizing nanomaterials according to an embodiment of the present disclosure.

The present disclosure can be variously modified and has various embodiments. Thus, specific embodiments are illustrated in the drawings by way of example and will be described in detail in the detailed description. The effects and features of the present disclosure and methods of achieving them will be apparent with reference to embodiments to be described in detail below along with the drawings. The present disclosure is not limited to the embodiments disclosed below, but can be implemented in various forms.

Throughout the present specification, the terms such as "first" and "second" do not have restrictive meanings and are used for distinguishing one component from other components.

Throughout the present specification, a singular expression includes a plural expression unless defined differently in the context.

Throughout the present specification, the term "include" or "have" means that the features or components described in the specification are present, and not excludes a possibility that one or more different features or components are added. Throughout the present specification, when a certain portion "includes" a certain component, this indicates that other components are not excluded, but may be further included unless specially described to the contrary.

Throughout the present specification, when a member is referred to as being located "on" another member, this includes not only a case where the two members are in contact with each other, but also a case where still another member is present between the two members.

Throughout the present specification, sizes of components may be exaggerated or reduced in the drawings for convenience of description. For example, the size and thickness of each component indicated in the drawings are arbitrarily illustrated for convenience of description, and thus the present disclosure is not necessarily limited to what is illustrated.

Throughout the present specification, x, y, and z axes are not limited to three axes on the orthogonal coordinate system, and can be construed as a wide meanings including them. For example, the x, y, and z axes may be orthogonal to one another, but may indicate different directions that are not orthogonal to one another.

Throughout the present specification, when a certain embodiment may be implemented differently, a specific process order may be performed differently from the described order. For example, two consecutively described processes may be performed substantially at the same time or performed in the order opposite to the described order.

Hereinafter, embodiments of the present disclosure will be described in detail with reference to the accompany drawings. When described with reference to the drawings, components identical or corresponding to each other are given the same reference sign, and duplicate description thereof will be omitted.

An embodiment of the present disclosure provides a standalone precursor for synthesizing nanomaterials which has a post shape and a porous structure.

A standalone precursor for synthesizing nanomaterials according to an embodiment of the present disclosure is directly put into a synthesizing apparatus without a reaction module mounting the precursor, which makes it possible to improve process efficiency.

Figure 1B:
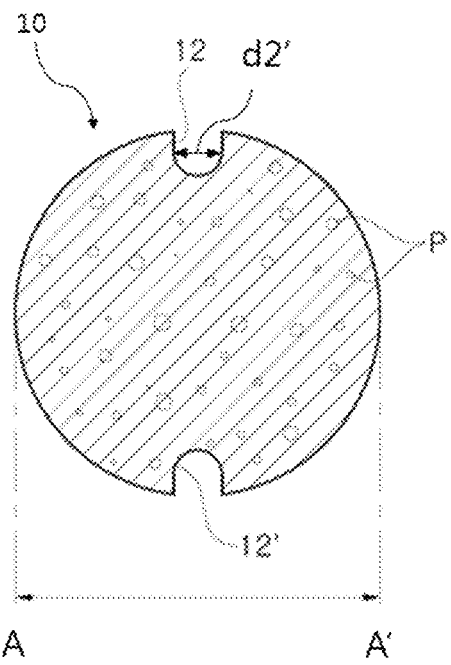

FIGS. 1A and 1B are views illustrating a standalone precursor for synthesizing nanomaterials according to an embodiment of the present disclosure. Specifically, FIG. 1B is a sectional view illustrating a standalone precursor for synthesizing nanomaterials along line A-A' of FIG. 1.

Figure 2A:
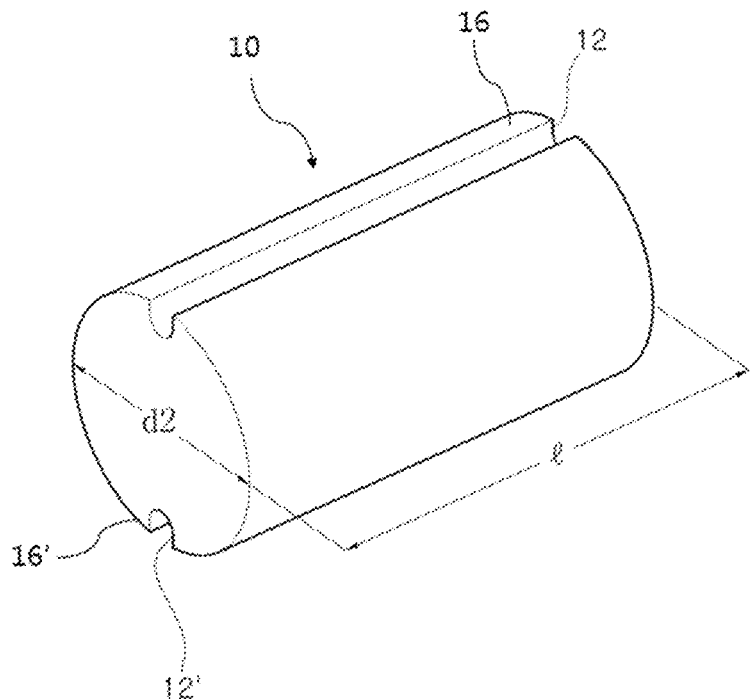
FIGS. 2A, 2B, and 2C are views illustrating a standalone precursor for synthesizing nanomaterials according to the shape of a reception portion.
Figure 2B:
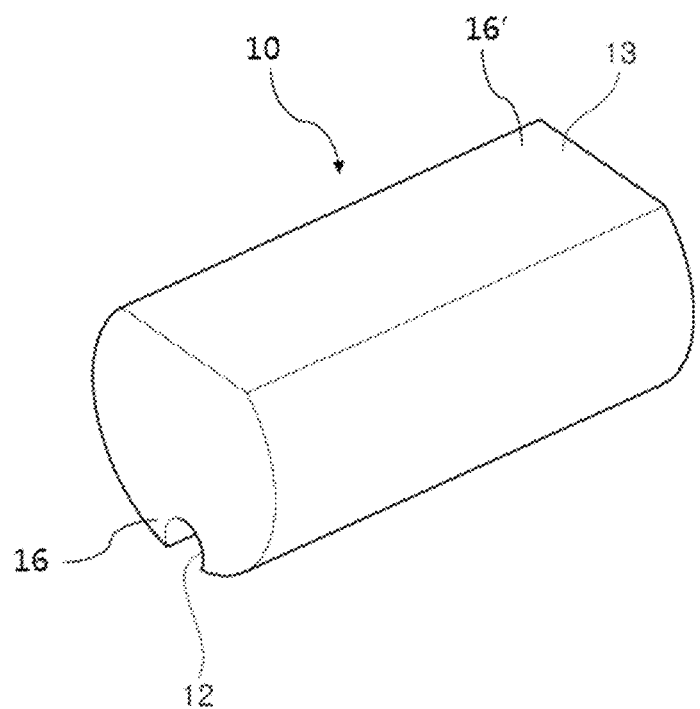
Figure 2C:
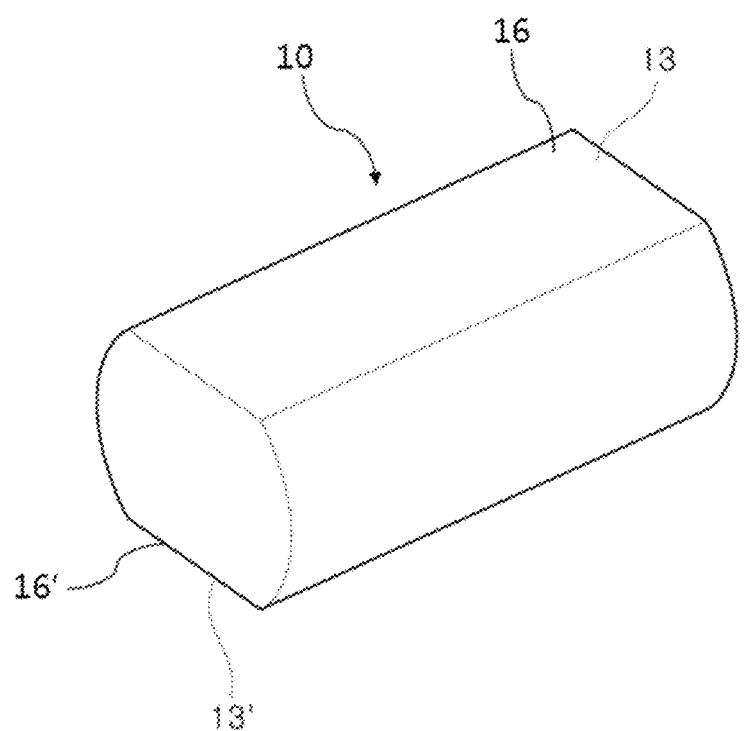

FIGS. 2A, 2B, and 2C are views illustrating a standalone precursor for synthesizing nanomaterials according to the shape of a reception portion. Specifically, FIG. 2A is a view illustrating a standalone precursor 10 for synthesizing nanomaterials, in which receiving grooves 12 and 12' are formed in two reception portions 16 and 16'. FIG. 2B is a view illustrating a standalone precursor 10 for synthesizing nanomaterials, in which a receiving groove 12 is formed in one reception portion 16 and a receiving surface 13 is formed on the other reception portion 16'. FIG. 2C is a view illustrating a standalone precursor 10 for synthesizing nanomaterials, in which receiving surfaces 13 and 13' are formed on two reception portions 16 and 16'.

According to an embodiment of the present disclosure, as a standalone precursor for synthesizing nanomaterials which has a post shape, a standalone precursor for synthesizing nanomaterials which has a porous structure and includes a reception portion which is formed along a length of the precursor and enables the precursor to be received therein may be provided. Particularly, the standalone precursor for synthesizing nanomaterials may include one or more reception portions, and more particularly two or more reception portions.

The standalone precursor for synthesizing nanomaterials according to an embodiment of the present disclosure includes the reception portion, and thus is directly put into an apparatus for synthesizing nanomaterials without a reaction module mounting the precursor, which makes it possible to improve process efficiency. Specifically, the standalone precursor for synthesizing nanomaterials has lower thermal capacity than the reaction module, and can thus be put into a chamber of the apparatus for synthesizing nanomaterials (to be described below) at a rapid speed, which makes it possible to effectively improve efficiency of a process of synthesizing nanomaterials. Further, the standalone precursor for synthesizing nanomaterials can be put into a chamber without a reaction module, facilitates maintenance, and can reduce production costs for nanomaterial synthesis. Further, since the standalone precursor for synthesizing nanomaterials is light, a possibility of damage to a synthesizing apparatus due to a thermal shock from which components of the synthesizing apparatus suffer is low, and thus stability of the apparatus for synthesizing nanomaterials can be improved.

Further, the standalone precursor for synthesizing nanomaterials according to an embodiment of the present disclosure can effectively synthesize nanomaterials.

According to an embodiment of the present disclosure, the standalone precursor for synthesizing nanomaterials may be produced according to the following method, but a method of producing the standalone precursor for synthesizing nanomaterials is not limited thereto. Specifically, the standalone precursor for synthesizing nanomaterials may be produced by obtaining a porous precursor for synthesizing nanomaterials which has a post shape, and then forming a reception portion on the precursor.

For example, the method of producing the standalone precursor for synthesizing nanomaterials may include steps of preparing first powder including raw material powder and a catalyst, nanosizing the first powder to obtain second powder, producing a dispersant solution including the second powder, molding the dispersant solution to obtain a post-like precursor for synthesizing nanomaterials, and forming pores in the precursor to obtain a porous precursor for synthesizing nanomaterials, whereby a post-like and porous precursor for synthesizing nanomaterials can be obtained.

According to an embodiment of the present disclosure, the raw material powder may be, for example, powdered boron. Specifically, the boron may be amorphous and/or crystalline. Since the amorphous boron has low hardness, the amorphous boron effectively contributes to nanosizing catalyst metal and/or metal oxide particles mixedly added in a nanosizing step, specifically in a process of nanosizing boron powder using a vortex of air, and boron powder is coated on or embedded in surfaces of catalyst metal and/or metal oxide, which makes it possible to obtain highly efficient seed precursor nanoparticles.

According to an embodiment of the present disclosure, the catalyst may be provided in a powder phase. The catalyst may be more effective for the amorphous boron. This is because, when the amorphous boron is used for the catalyst, a lot of boron nano-powder can be produced within a very short time in a nanosizing process based on an air jet and/or its vortex.

The catalyst is mixed with raw material powder particles in a process of nanosizing raw material powder, and precursor nanoparticles are formed. The precursor nanoparticles function as seeds during producing of nanomaterials and react with gas, and thereby can contribute to nanomaterial synthesis. For example, the boron precursor nanoparticles react with nitrogen, and thereby can contribute to synthesis of boron nitride nanotubes.

The catalyst is not particularly limited, and examples thereof may include Fe, Mg, Ni, Cr, Co, Zr, Mo, W and/or Ti, and oxides thereof.

According to an embodiment of the present disclosure, the first powder may have a weight ratio of 2:1 to 9.5:0.5 between the raw material powder and the catalyst. Specifically, the weight ratio between the raw material powder and the catalyst included in the first powder may be 3:1 to 15:1, 5:1 to 13:1, or 7:1 to 10:1. When the weight ratio of the raw material powder and the catalyst included in the first powder is within the aforementioned range, the nanomaterials can be effectively formed.

According to an embodiment of the present disclosure, the method of nanosizing the first powder may include putting the first powder into a pulverizing region formed by air. For example, the first powder may be nanosized through air jet milling. In this case, process conditions of the air jet milling may be as follows: a feed rate of the first powder may be 2 g/min or more and 10 g/min or less, a feed pressure may be 80 psi or higher and 120 psi or lower, and a grinding pressure may be 60 psi or higher and 100 psi or lower. The first powder can be effectively nanosized though the air jet milling process of the above conditions. Through this, the catalyst is embedded in the boron powder, which can act as a main cause in a nanotube growth progressed thereafter.

According to an embodiment of the present disclosure, the dispersant solution may include the second powder, a binder powder, and a foaming agent. In this case, a weight ratio of the second powder, the binder powder, and the foaming agent may be (1.0):(1.0 to 4.0):(0.1 to 0.2). In this case, as the binder powder and the foaming agent, those used in the art may be used without limitation.

The step of molding the dispersant solution including the second powder to obtain the post-like precursor for synthesizing nanomaterials may include injecting the dispersant solution into a post-like mold and heating the mold. A temperature at which the mold is heated may be about 150° C. or higher and about 250° C. or lower, and a time for which the mold is heated may be about 0.5 hr or more and about 8 hr or less. The mold is heat-treated on the temperature and time conditions of the aforementioned range, the post-like precursor for synthesizing nanomaterials can be easily obtained. In this case, the step of obtaining the post-like precursor for synthesizing nanomaterials and the step of obtaining the porous precursor for synthesizing nanomaterials may be performed at the same time. For example, through a process of putting the dispersant solution into the post-like mold and heat-treating the mold, the standalone precursor for synthesizing nanomaterials which has a post shape and a porous structure may be obtained.

The method of forming the reception portion on the post-like and porous precursor for synthesizing nanomaterials which is produced by the above method is not particularly limited. For example, the reception portion may be formed by processing the porous precursor for synthesizing nanomaterials which is produced, or the reception portion may be formed at the same time as the step of obtaining the post-like precursor for synthesizing nanomaterials using a prepared mold to form the reception portion. Further, as will be described below, the method of forming the plurality of through-holes in the post-like precursor for synthesizing nanomaterials is not particularly limited.

According to an embodiment of the present disclosure, the precursor may have a circular post (cylindrical) shape, a semicircular post shape, an elliptical post shape, or a polygonal post shape. Here, the cylindrical precursor may mean that a cross section perpendicular to a length of the precursor is a circle. Likewise, the semicircular post may mean that a cross section thereof is a semicircular shape, the elliptical post may mean that a cross section thereof is an elliptical shape, and the polygonal post may mean that a cross section thereof is a polygonal shape. For example, the polygonal post may be a trigonal post, a tetragonal post (a regular post, a rectangular post, or a rhombic post), a pentagonal post, a hexagonal post, a heptagonal post, or an octagonal post. However, there is no intention to limit the polygonal post shape.

According to an embodiment of the present disclosure, the standalone precursor for synthesizing nanomaterials may have a cylindrical shape. In this case, the "cylindrical shape" includes not only a basic cylindrical shape but also a shape modified from the cylindrical shape. As the standalone precursor for synthesizing nanomaterials has the cylindrical shape, it can be easily put into a chamber of a nanomaterial synthesizing apparatus to be described below. As a result, the nanomaterial synthesizing apparatus can have improved process efficiency and reduced process difficulty.

The following description will be made focusing on an embodiment in that the shape of the standalone precursor for synthesizing nanomaterials is a cylindrical shape.

According to an embodiment of the present disclosure, the standalone precursor for synthesizing nanomaterials may include two or more reception portions. A precursor in the related art has no reception portions separately provided thereto. Thus, the precursor needs to be mounted on a reaction module and then put into a reactor, which reduces process efficiency. In contrast, the standalone precursor for synthesizing nanomaterials according to an embodiment of the present disclosure itself includes the reception portions formed therein. Thus, the precursor can be directly put into the synthesizing apparatus even without a reaction module, which makes it possible to effectively improve process efficiency. The term "standalone" may mean that, as described above, the precursor can be directly put into the synthesizing apparatus without being mounted on a separate reaction module.

According to an embodiment of the present disclosure, the standalone precursor for synthesizing nanomaterials may include two or more reception portions, specifically two reception portions. The two reception portions may be provided symmetrically with respect to a plane passing through the central axis of the post-like standalone precursor for synthesizing nanomaterials. When the two reception portions are provided to be symmetrical to each other, the standalone precursor for synthesizing nanomaterials may be effectively received in a receiver of the nanomaterials synthesizing apparatus to be described below. Further, the reception portions may further facilitate stacking and storing of the standalone precursor for synthesizing nanomaterials. In addition, the standalone precursor for synthesizing nanomaterials may be easily put into a chamber including a reaction zone.

According to an embodiment of the present disclosure, the reception portion may include at least one receiving groove that is continuous along the length of the precursor, and extends inward from the outside (or the outer circumferential surface) of the precursor. Referring to FIG. 2A, two receiving grooves 12 and 12' may be formed, which are continuous along the length l of the standalone precursor 10 for synthesizing nanomaterials. The receiving groove may be fastened to fasteners provided to the receiver of the nanomaterial synthesizing apparatus to be described below. As a result, the standalone precursor for synthesizing nanomaterials can be stably received in the receiver. Further, the receiving groove may be correspond to a shape of a gas feed pipe (e.g., a diffuser, a tube, etc.) that feeds a reaction gas and provided to a chamber of the nanomaterial synthesizing apparatus to be described below. As a result, the standalone precursor for synthesizing nanomaterials can be easily put into the camber, and the reaction gas can be stably fed into the standalone precursor for synthesizing nanomaterials.

According to an embodiment of the present disclosure, a ratio between the diameter and the length of the standalone precursor for synthesizing nanomaterials may be 1:3 or more and 1:6 or less. Referring to FIG. 2A, a ratio between the diameter d2 and the length of the standalone precursor for synthesizing nanomaterials may have a range of 1:3.5 or more and 1:5.5 or less, 1:4 or more and 1:5 or less, 1:3 or more and 1:4.5 or less, 1:3.5 or more and 1:4 or less, 1:4 or more and 1:6 or less, or 1:4.5 or more and 1:5.5 or less. When the ratio between the diameter and the length of the standalone precursor for synthesizing nanomaterials is within the above range, a reaction gas may be effectively fed to the standalone precursor for synthesizing nanomaterials in the chamber of the nanomaterial synthesizing apparatus, and synthesizing efficiency of nanomaterials may further increase. Further, when the ratio between the diameter and the length of the standalone precursor for synthesizing nanomaterials is adjusted to the above range, the standalone precursor for synthesizing nanomaterials may be effectively received in the receiver, and be easily put into the chamber.

According to an embodiment of the present disclosure, the diameter of the standalone precursor for synthesizing nanomaterials may be 50 mm or more and 70 mm or less. Specifically, the diameter of the standalone precursor for synthesizing nanomaterials may 55 mm or more and 65 mm or less, 50 mm or more and 60 mm or less, 60 mm or more and 70 mm or less, or 60 mm or more and 65 mm or less. When the diameter of the standalone precursor for synthesizing nanomaterials is within the above range, the reaction gas fed to the chamber may be uniformly fed to the entire inside of the standalone precursor for synthesizing nanomaterials. As a result, synthesizing efficiency of nanomaterials using the standalone precursor for synthesizing nanomaterials may further increase.

Referring to FIG. 2A, the diameter d2 of the standalone precursor 10 for synthesizing nanomaterials may refer to the longest of lengths passing through the central axis in a cross section of the standalone precursor (e.g., the post-like standalone precursor) for synthesizing nanomaterials. Meanwhile, the diameter of the standalone precursor for synthesizing nanomaterials may be changed depending on a diameter of the chamber of the nanomaterial synthesizing apparatus to be described below.

According to an embodiment of the present disclosure, the length of the standalone precursor for synthesizing nanomaterials may be 200 mm or more and 300 mm or less. Specifically, the length of the standalone precursor for synthesizing nanomaterials may 220 mm or more and 280 mm or less, 240 mm or more and 260 mm or less, 200 mm or more and 250 mm or less, or 250 mm or more and 300 mm or less. The standalone precursor for synthesizing nanomaterials which has the length of the above range may be effectively received in the receiver, and be easily put into the chamber.

According to an embodiment of the present disclosure, a ratio of the diameter of the standalone precursor for synthesizing nanomaterials to a diameter of each of the receiving grooves may be 1:0.0001 to 1:0.3. Specifically, referring to FIGS. 1B and 2A, a ratio between a length of the diameter d2 of the standalone precursor 10 for synthesizing nanomaterials to a length of the diameter d2' of each of the receiving grooves 12 and 12' may be 1:0.001 to 1:0.3, 1:0.01 to 1:0.3, or 1:0.1 to 1:0.3. When the ratio between a length of the diameter d2 of the standalone precursor 10 for synthesizing nanomaterials to a length of the diameter d2' of each of the receiving grooves 12 and 12' is within the above range, the standalone precursor 10 for synthesizing nanomaterials can be stably received in the receiver through the receiving grooves 12 and 12', and a reduction in mechanical physical properties, such as strength and durability, of the standalone precursor 10 for synthesizing nanomaterials can be effectively suppressed. In this case, referring to FIG. 1B, the diameter d2' of each of the receiving grooves 12 and 12' may refer to the shortest of lengths passing through the central axes of the receiving grooves 12 and 12'.

According to an embodiment of the present disclosure, the reception portions may include at least one receiving surface provided as a face that is flatly continuous along the length of the precursor. Referring to FIG. 2C, two receiving surfaces 13 and 13' may be formed, which are continuous along the length of the standalone precursor 10 for synthesizing nanomaterials. The receiving surfaces 13 and 13' may be formed flatly, which may facilitate stacking and storing of the standalone precursor for synthesizing nanomaterials.

According to an embodiment of the present disclosure, the reception portions 16 and 16' may include a receiving surface provided as a face that is flatly continuous along the length of the precursor and a receiving groove that is continuous along the length of the precursor and extends inward from the outside (or the outer circumferential surface) of the precursor. Referring to FIG. 2B, one receiving surface 13 and one receiving groove 12 may be formed, which are continuous along the length of the standalone precursor 10 for synthesizing nanomaterials.

According to an embodiment of the present disclosure, the standalone precursor for synthesizing nanomaterials has a porous structure. Referring to FIG. 1B, the standalone precursor 10 for synthesizing nanomaterials may have a porous structure including a plurality of micro-pores P. In this case, for convenience of description, the micro-pores P are enlarged and illustrated in FIG. 1B. Further, it is disclosed in FIG. 1B that the plurality of micro-pores P are included inside the standalone precursor 10 for synthesizing nanomaterials, but the plurality of micro-pores P may also be formed in the outer surface of the standalone precursor 10 for synthesizing nanomaterials. As the standalone precursor for synthesizing nanomaterials has the porous structure, the contact area with the reaction gas further increases, which makes it possible to further improve nanomaterials formation efficiency.

According to an embodiment of the present disclosure, the porous structure may be made of a material used to produce the standalone precursor for synthesizing nanomaterials, or by a method of producing the standalone precursor for synthesizing nanomaterials.

Figure 3A:
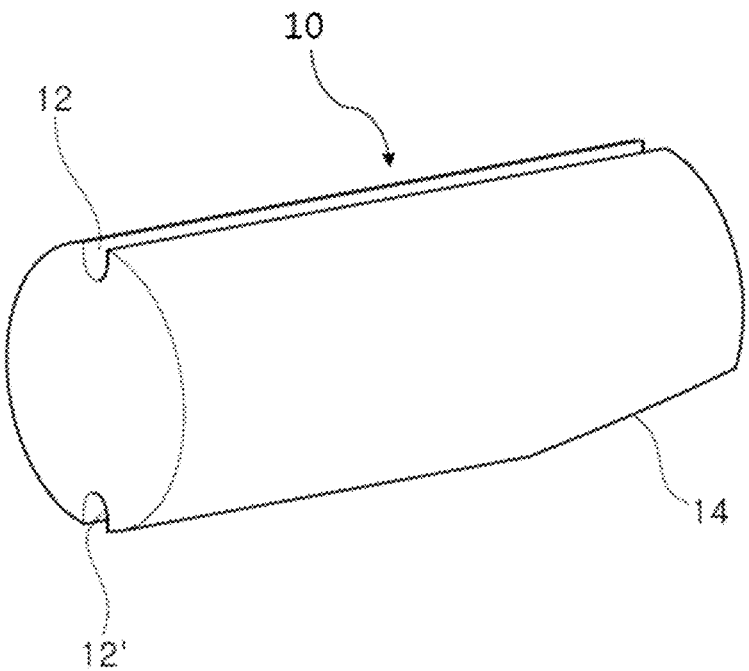
FIGS. 3A and 3B are views illustrating a standalone precursor for synthesizing nanomaterials, which is chamfered according to an embodiment of the present disclosure.
Figure 3B:
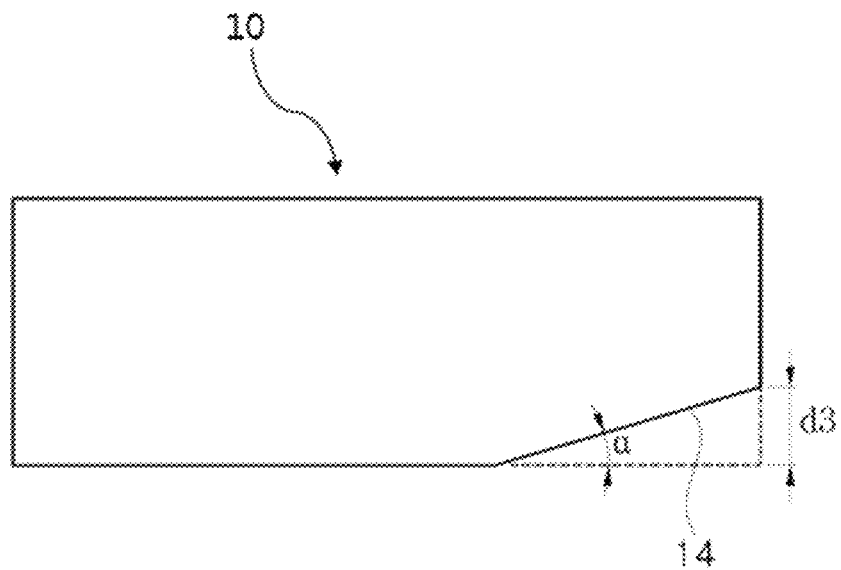

FIGS. 3A and 3B are views illustrating a standalone precursor for synthesizing nanomaterials, which is chamfered according to an embodiment of the present disclosure.

According to an embodiment of the present disclosure, the standalone precursor for synthesizing nanomaterials may be chamfered. Specifically, the standalone precursor for synthesizing nanomaterials may include a portion chamfered (hereinafter referred to as a chamfered portion) on a post-like bottom or top surface. By chamfering the standalone precursor for synthesizing nanomaterials, the standalone precursor for synthesizing nanomaterials can be prevented from being deformed or damaged when passing through each part of the nanomaterial synthesizing apparatus to be described below.

The chamfered portion of the standalone precursor for synthesizing nanomaterials may be formed at an angle of 45° or less. Referring to FIG. 3B, an angle α of the chamfered portion may be 45° or less, 40° or less, 35° or less, or 30° or less. Further, the angle α of the chamfered portion may be 15° or more, 20° or more, or 25° or more. Referring to FIG. 3B, a height d3 of the chamfered portion of the standalone precursor 10 for synthesizing nanomaterials may be 10 mm or more and 20 mm or less, 10 mm or more and 15 mm or less, or 15 mm or more and 20 mm or less.

When the angle and height of the chamfered portion are within the above ranges, the standalone precursor for synthesizing nanomaterials can be prevented from being deformed or damaged, especially be easily put into the chamber, when passing through each part of the nanomaterial synthesizing apparatus to be described below.

According to an embodiment of the present disclosure, a length ratio between the diameter of the standalone precursor for synthesizing nanomaterials and the height of the chamfered portion may be 1:0.1 to 1:0.35. Referring to FIGS. 2A and 3B, a length ratio between the diameter d2 of the standalone precursor 10 for synthesizing nanomaterials and the height d3 of the chamfered portion 14 may be 1:0.15 to 1:0.35, 1:0.1 to 1:0.25, or 1:0.2 to 1:0.35. When the length ratio between the diameter of the standalone precursor for synthesizing nanomaterials and the height of the chamfered portion is within the above range, the mechanical properties such as durability of the standalone precursor for synthesizing nanomaterials can be inhibited from being reduced.

Figure 4A:
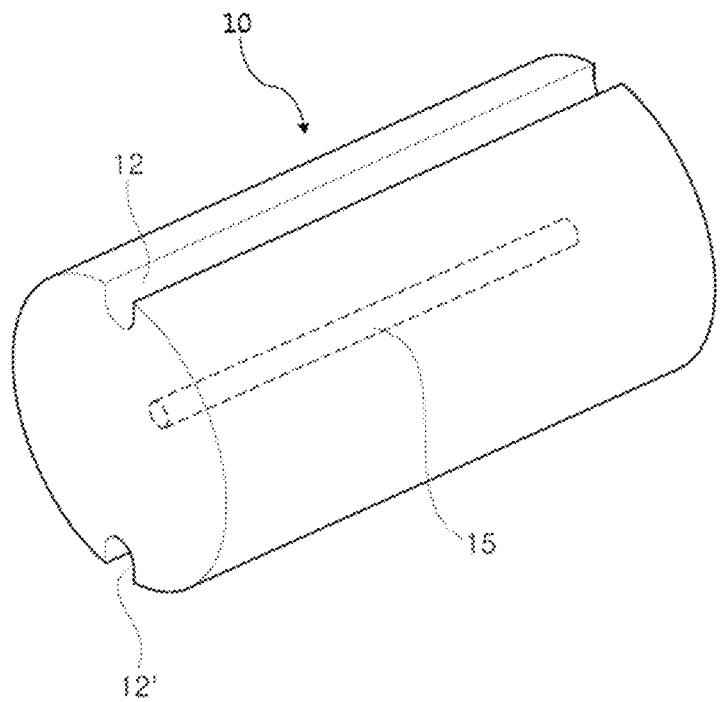
FIGS. 4A and 4B are views illustrating a standalone precursor for synthesizing nanomaterials, which includes an insertion rod according to an embodiment of the present disclosure.
Figure 4B:
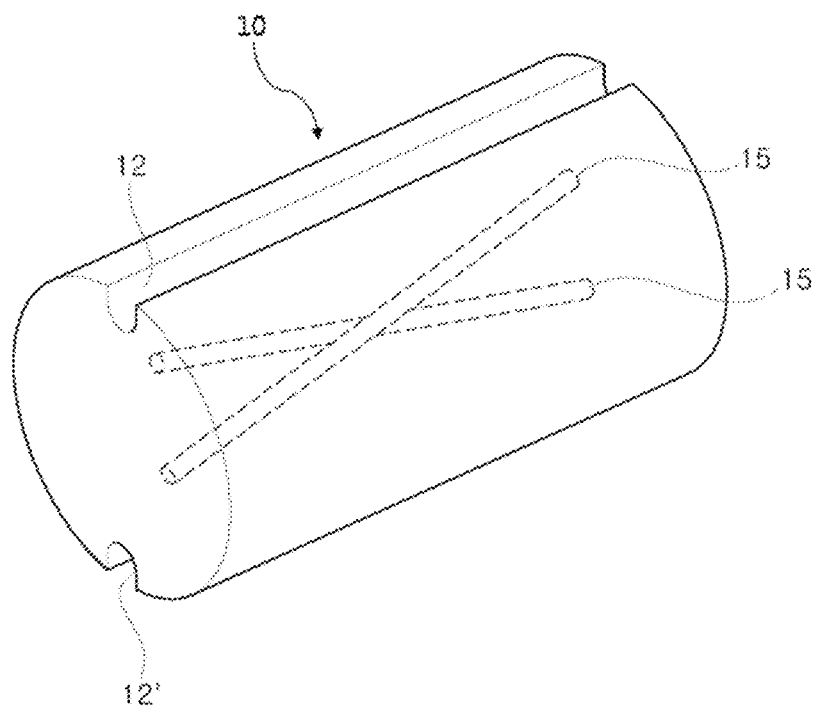

FIGS. 4A and 4B are views illustrating a standalone precursor for synthesizing nanomaterials, which includes an insertion rod according to an embodiment of the present disclosure. Specifically, it is illustrated in FIG. 4A that one insertion rod 15 is provided inside the standalone precursor 10 for synthesizing nanomaterials, and it is illustrated in FIG. 4B that two insertion rods 15 are provided inside the standalone precursor 10 for synthesizing nanomaterials.

According to an embodiment of the present disclosure, the standalone precursor for synthesizing nanomaterials may further include one or more insertion rods provided inside the precursor along the length of the precursor. The insertion rod may be formed of a heat-resistant metal. Further, the insertion rod may be formed of the aforementioned catalyst. The insertion rod is inserted into the precursor along the length of the precursor, and thereby lengthwise rigidity of the standalone precursor for synthesizing nanomaterials can be effectively improved, and the insertion rod can serve as a metal catalyst that accelerates synthesis and growth of the nanomaterial (e.g., boron nitride nanotube). Further, the insertion rod may have a circular post shape, a semicircular post shape, an elliptical post shape, or a polygonal post shape.

According to an embodiment of the present disclosure, the insertion rod may have a diameter of 2 mm or more and 5 mm or less, and a length of 120 mm or more and 180 mm or less. When the diameter and length of the insertion rod are within the above ranges, the lengthwise rigidity of the standalone precursor for synthesizing nanomaterials can be effectively improved, and the insertion rod can smoothly serve as a metal catalyst that accelerates synthesis and growth of the nanomaterial (e.g., boron nitride nanotube).

According to an embodiment of the present disclosure, a ratio between the diameter of the standalone precursor for synthesizing nanomaterials and the diameter of the insertion rod may be 1:0.02 to 1:0.04. Further, a ratio between the length of the standalone precursor for synthesizing nanomaterials and the length of the insertion rod may be 1:0.4 to 1:0.7. When the diameter and length ratios between the standalone precursor for synthesizing nanomaterials and the insertion rod are within the above range, the lengthwise rigidity of the standalone precursor for synthesizing nanomaterials can be effectively improved, and the nanomaterial synthesizing efficiency can be inhibited from being reduced.

The heat-resistant metal insertion rod may be formed of a material that can withstand a temperature of 1,400° C. or higher, for example, tungsten. However, the material of the insertion rod is not limited, and a heat-resistant material capable of withstanding the aforementioned temperature or higher may be used.

Referring to FIG. 4A, the insertion rod 15 may be provided such that the central axis of the post-like standalone precursor 10 for synthesizing nanomaterials is parallel to that of the post-like insertion rod 15. For example, the insertion rod 15 may be provided inside the standalone precursor 10 for synthesizing nanomaterials so as to be parallel to a bottom surface adjacent to each of the receiving grooves 12 or 12'.

Referring to FIG. 4B, the two insertion rods 15 may be provided inside standalone precursor 10 for synthesizing nanomaterials in a shape across each other. As a result, the lengthwise rigidity of the standalone precursor for synthesizing nanomaterials can be effectively improved, and the insertion rods can serve as a catalyst to improve synthesis reactivity of the nanomaterial inside the precursor. In this example, each of the two insertion rods 15 are inclined with respect to each of the receiving grooves 12 or 12'. However, in another example, each of the two insertion rods 15 may be parallel to each of the receiving grooves 12 or 12'.

Figure 5:
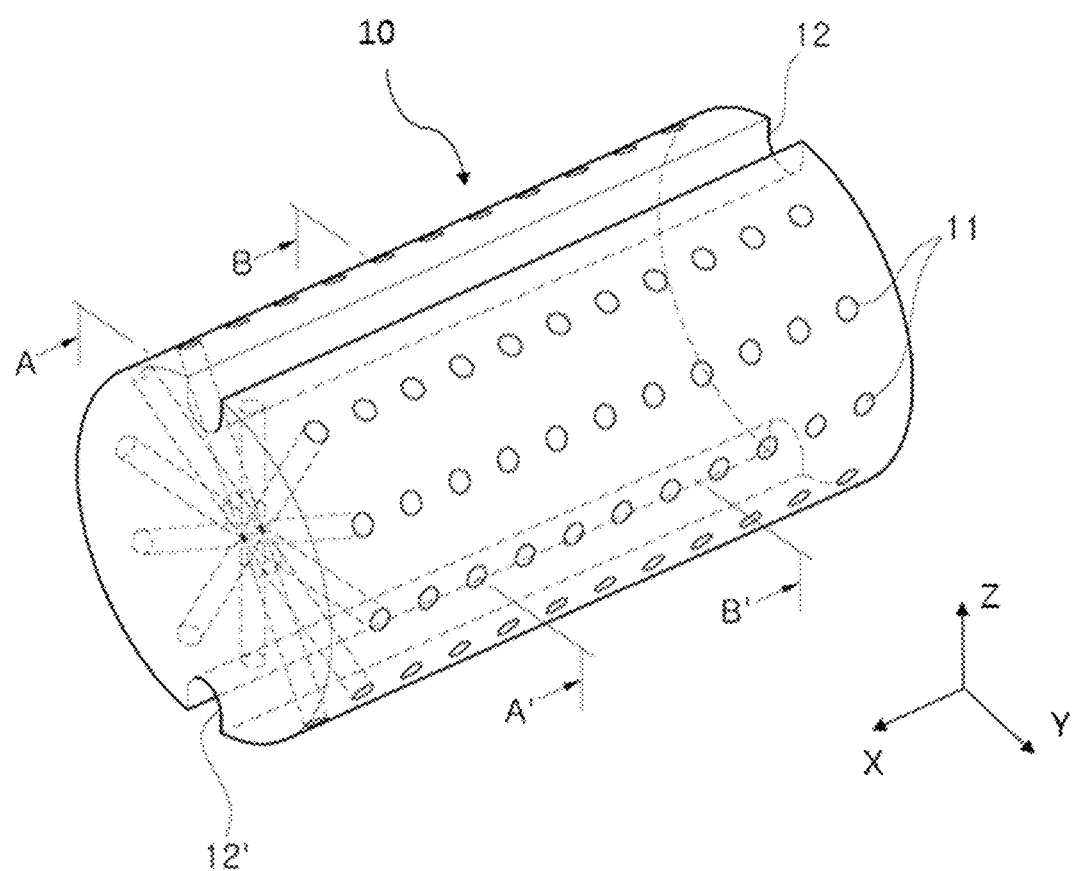
FIG. 5 is a view illustrating a standalone precursor for synthesizing nanomaterials, which includes a through-hole according to an embodiment of the present disclosure.

FIG. 5 is a view illustrating a standalone precursor for synthesizing nanomaterials, which includes a through-hole according to an embodiment of the present disclosure.

Figure 6A:
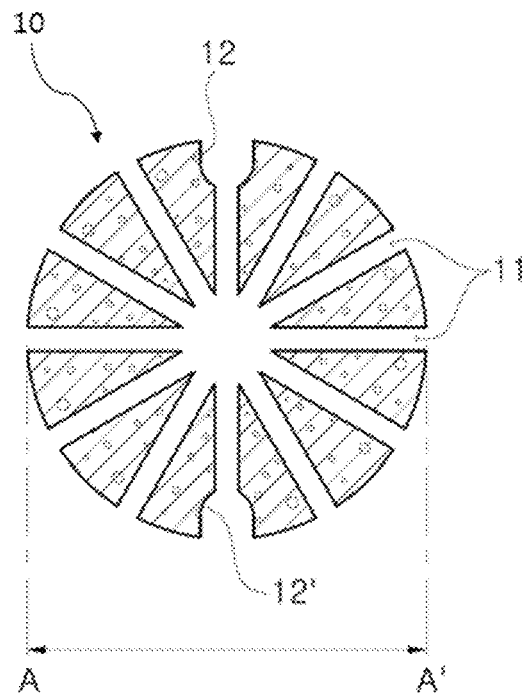
FIG. 6A is a sectional view taken along line A-A' of FIG. 5 and illustrating the standalone precursor for synthesizing nanomaterials.
Figure 6B:
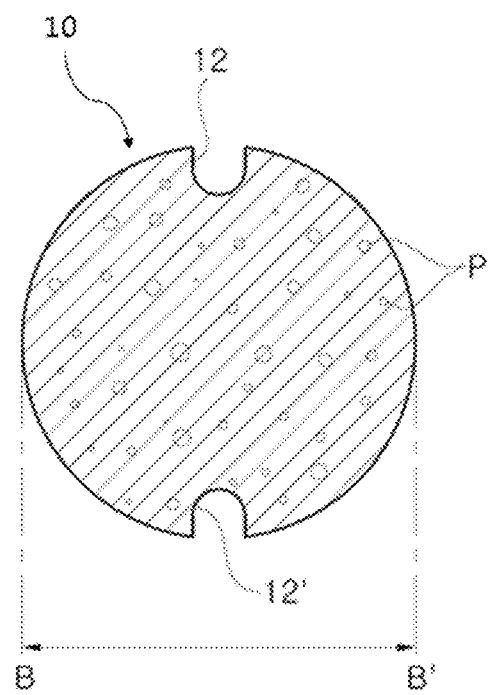
FIG. 6B is a sectional view taken along line B-B' of FIG. 5 and illustrating the standalone precursor for synthesizing nanomaterials.
Figure 6C:
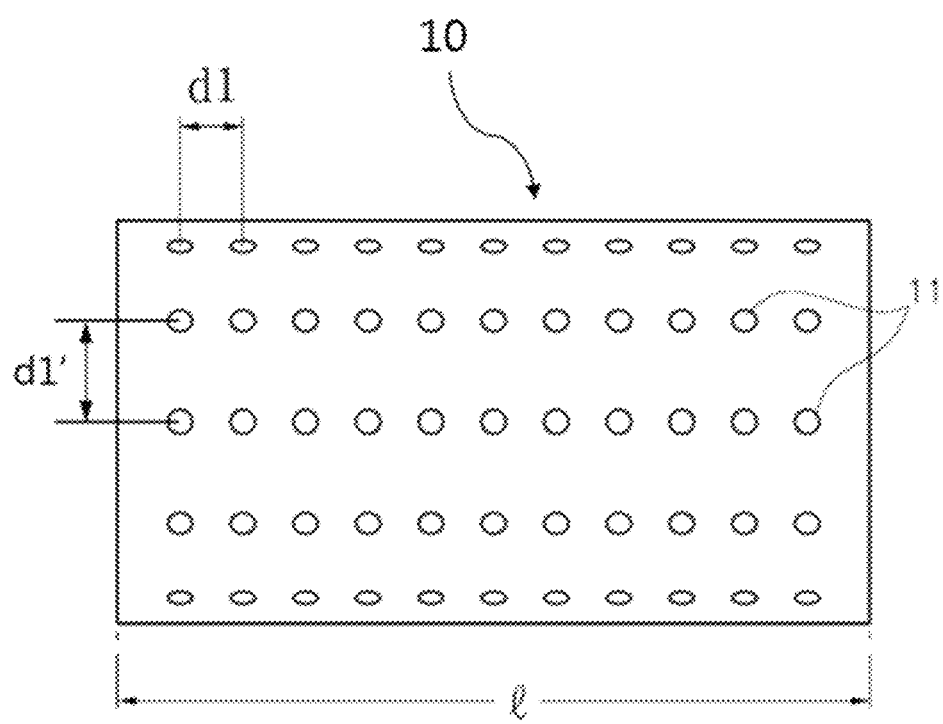
FIG. 6C is a side view illustrating the standalone precursor for synthesizing nanomaterials.

FIG. 6A is a sectional view taken along line A-A' of FIG. 5 and illustrating the standalone precursor for synthesizing nanomaterials, FIG. 6B is a sectional view taken along line B-B' of FIG. 5 and illustrating the standalone precursor for synthesizing nanomaterials, and FIG. 6C is a side view illustrating the standalone precursor for synthesizing nanomaterials.

Figure 7A:
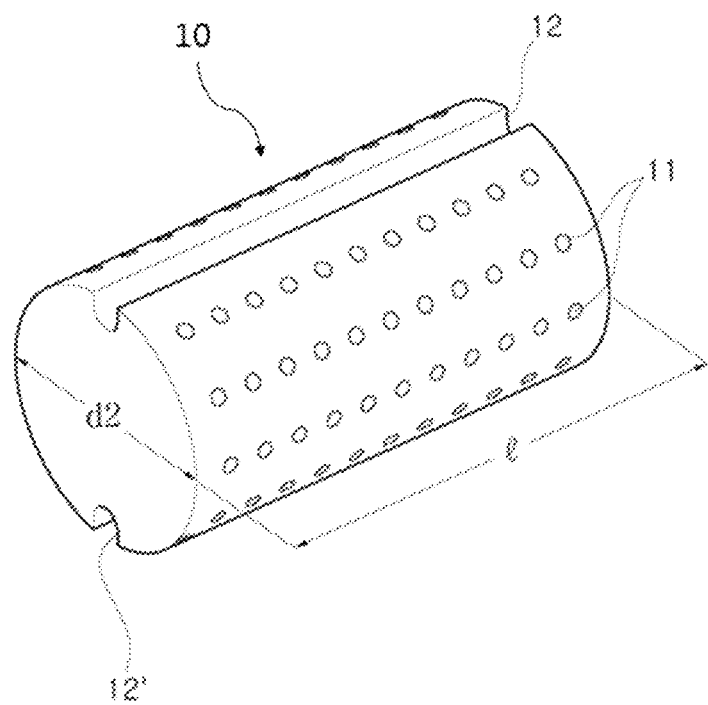
FIGS. 7A, 7B, and 7C are views illustrating the standalone precursor for synthesizing nanomaterials, which includes a through-hole according to the shape of a reception portion.
Figure 7B:
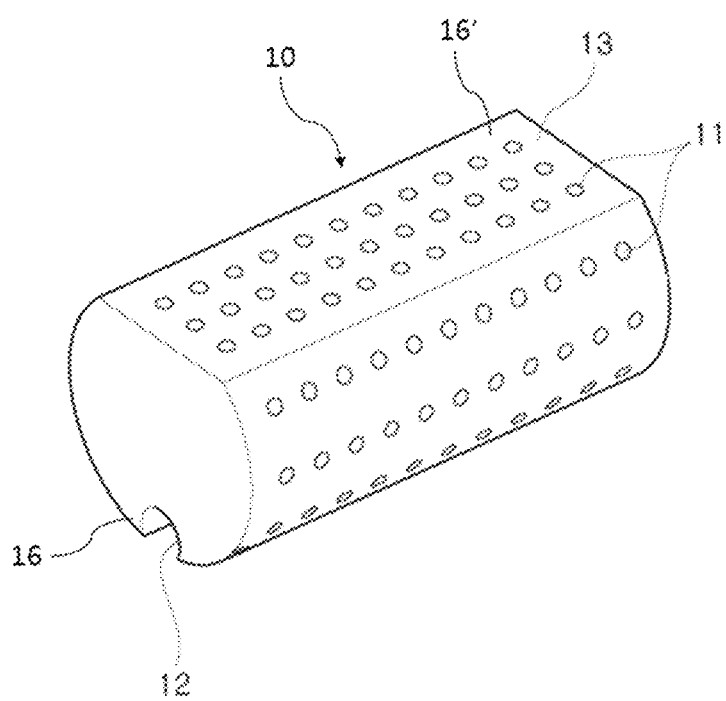
Figure 7C:
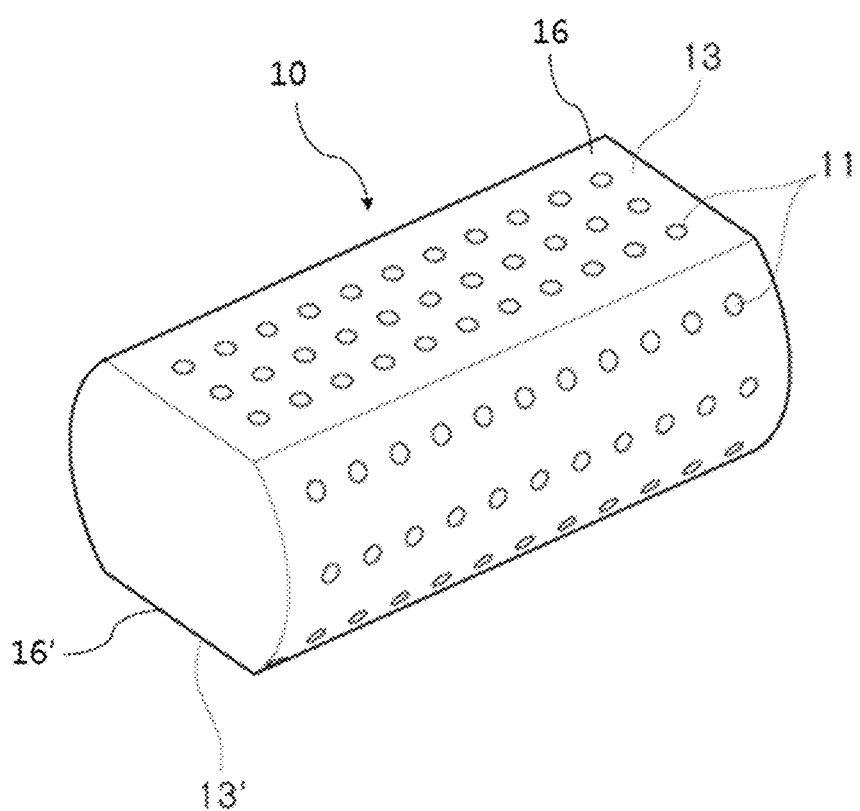

FIGS. 7A, 7B, and 7C are views illustrating the standalone precursor for synthesizing nanomaterials, which includes a through-hole according to the shape of a reception portion. Specifically, FIG. 7A is a view illustrating the standalone precursor 10 for synthesizing nanomaterials in which the receiving grooves 12 and 12' are formed in the two receiving portions. Meanwhile, although not illustrated in FIG. 7A, a plurality of though-holes 11 may be provided in portions where the receiving grooves 12 and 12' are formed. FIG. 7B is a view illustrating the standalone precursor 10 for synthesizing nanomaterials in which the receiving groove 12 is formed in one reception portion 16, and the receiving surface 13 is formed on the other reception portion 16'. FIG. 7C is a view illustrating the standalone precursor 10 for synthesizing nanomaterials in which the receiving surfaces 13 and 13' are formed on the two reception portions 16 and 16'. As illustrated in FIG. 7C, the plurality of though-holes 11 may be provided in the receiving surfaces 13 and 13'.

According to an embodiment of the present disclosure, the standalone precursor for synthesizing nanomaterials may include a plurality of through-holes that extend inward from the outside (or the outer circumferential surface) of the precursor. Referring to FIG. 5, the plurality of through-holes 11 extend inward from the outside (or the outer circumferential surface) of the post-like standalone precursor 10 for synthesizing nanomaterials. A reaction gas fed from the chamber of the nanomaterials synthesizing apparatus, which is to be described below, can flow into the plurality of through-holes. That is, as the standalone precursor for synthesizing nanomaterials includes the plurality of through-holes, a contact area with the reaction gas is more increased, which makes it possible to effectively and stably synthesize the nanomaterials.

According to an embodiment of the present disclosure, each of the through-holes may have a diameter of 2 mm (Ø2) or more than and 3 mm (Ø3) or less. When the diameters of the through-holes are within the above range, the reaction gas can be effectively transferred into and circulated in the precursor for synthesizing nanomaterials.

According to an embodiment of the present disclosure, the plurality of through-holes may be radially provided with respect to the central axis of a post. Referring to FIGS. 5 and 6A, the plurality of through-holes 11 may be radially provided on the basis of the central axis of the post-like standalone precursor 10 for synthesizing nanomaterials. As the plurality of through-holes may be radially provided with respect to the central axis of a post, the reaction gas fed from the nanomaterial synthesizing apparatus may effectively flow into the plurality of through-holes, and smoothly circulate inside and outside the precursor. As a result, the nanomaterials may be effectively formed in the standalone precursor for synthesizing nanomaterials.

Further, the plurality of through-holes radially provided with respect to the central axis of the post may be provided to be symmetrical to one another with respect to X, Y, and Z axes. Because the plurality of through-holes are provided symmetrically and radially, the reaction gas may maintain a smooth flow through the through-holes in the porous precursor for synthesizing nanomaterials. Meanwhile, the plurality of through-holes may be randomly provided.

According to an embodiment of the present disclosure, a ratio of the diameter of the standalone precursor for synthesizing nanomaterials to the diameter of each of the through-holes may range from 1:0.0001 to 1:0.1. Specifically, referring to FIGS. 5, 6C, and 7A, length ratio of a diameter d2 of the standalone precursor 10 for synthesizing nanomaterials to the diameter (whose reference sign is not given) of each of the through-holes may be 1:0.001 to 1:0.1, 1:0.01 to 1:0.1, 1:0.01 to 1:0.5, or 1:0.03 to 1:0.5. When the ratio of the diameter of the standalone precursor for synthesizing nanomaterials to the diameter of each of the through-holes is within the above range, the reaction gas can effectively flow into the plurality of through-holes, and smoothly circulate inside and outside the precursor.

According to an embodiment of the present disclosure, the plurality of through-holes may be spaced apart from one another along the length of the precursor.

Specifically, referring to FIG. 6C, the plurality of through-holes 11 may be spaced apart from one another along the length of the post-like standalone precursor 10 for synthesizing nanomaterials. As the plurality of through-holes are spaced apart from one another along the length of the precursor, the contact area between the reaction gas and the standalone precursor for synthesizing nanomaterials can effectively increases.

Meanwhile, as illustrated in FIG. 6C, an embodiment in which the plurality of through-holes 11 are spaced apart from one another at the same interval d1 along the length of the post-like standalone precursor 10 for synthesizing nanomaterials, the present disclosure is not limited thereto. For example, the plurality of through-holes 11 may be spaced apart from one another at different intervals along the length of the precursor, or may include through-holes spaced apart from one another at the same interval and through-holes spaced apart from one another at different intervals.

Referring to FIG. 6C, the plurality of through-holes 11 may be spaced apart from one another at intervals d1 of 10 mm or more and 20 mm or less along the length of the precursor 10. Further, the plurality of through-holes 11 may be spaced apart from one another at intervals d1' of 10 mm or more and 20 mm or less in a circumferential direction of the post-like precursor 10. When the spaced intervals of the plurality of through-holes are within the above range, the reaction gas can be effectively supplied to the standalone precursor for synthesizing nanomaterials.

According to an embodiment of the present disclosure, a ratio of the length of the standalone precursor for synthesizing nanomaterials to the spaced length of the through-holes adjacent to each other may be 1:0.0001 to 1:0.1, 1:0.001 to 1:0.1, 1:0.01 to 1:0.1, 1:0.01 to 1:0.05, or 1:0.03 to 1:0.5. Specifically, referring to FIG. 6C, when the ratio of the length of the standalone precursor 10 for synthesizing nanomaterials to the spaced interval d1 of the through-holes 11 adjacent to each other is within the above range, the contact area between the reaction gas and the standalone precursor for synthesizing nanomaterials can effectively increases, and a reduction in physical properties, such as strength and durability, of the standalone precursor for synthesizing nanomaterials can be effectively suppressed.

Figure 8:
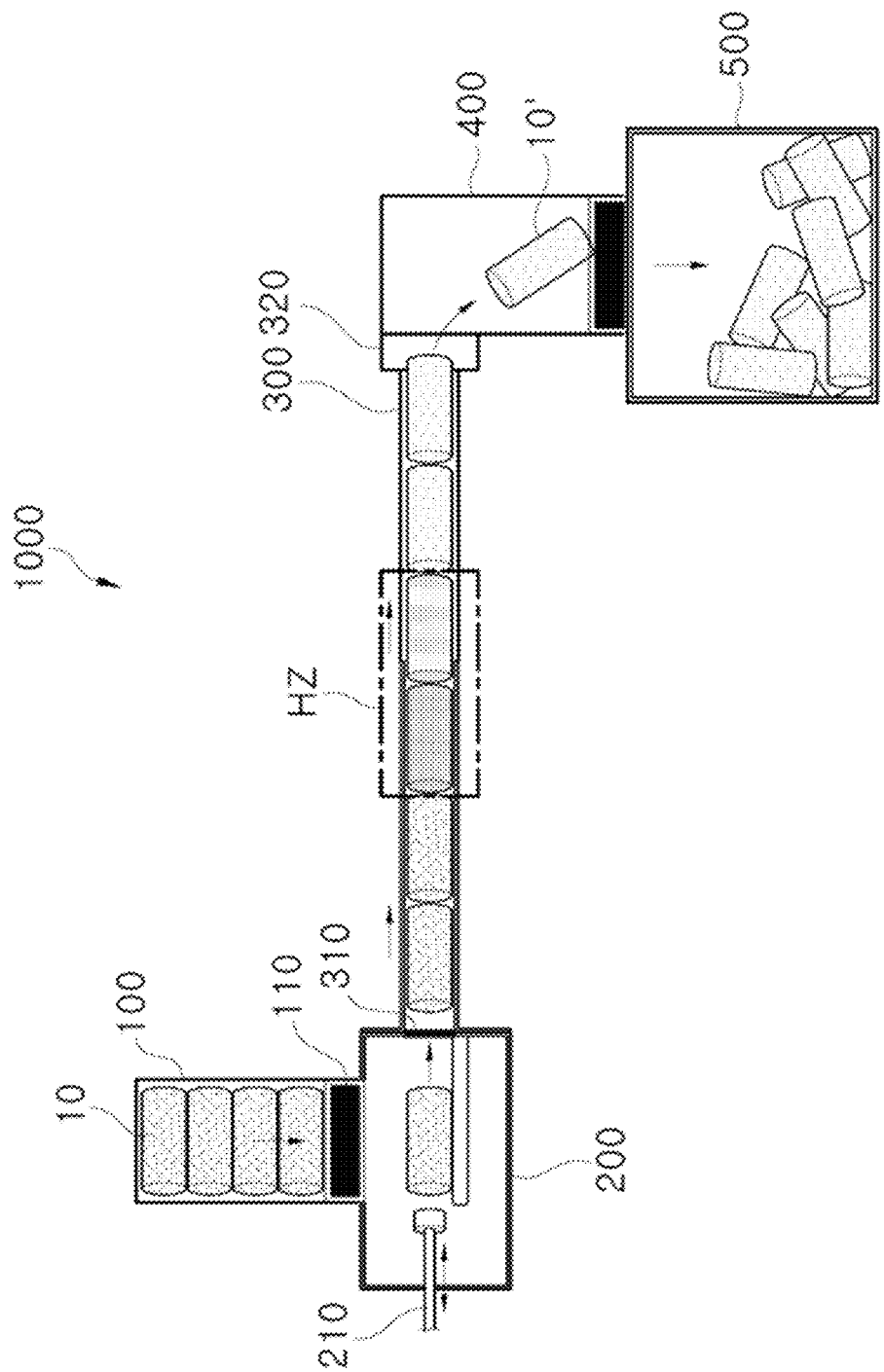
FIG. 8 is a view schematically illustrating an apparatus for synthesizing nanomaterials according to an embodiment of the present disclosure.

FIG. 8 is a view schematically illustrating an apparatus for synthesizing nanomaterials according to an embodiment of the present disclosure.

An embodiment of the present disclosure provides an apparatus for synthesizing nanomaterials includes: a receiver that receives one or more the standalone precursors for synthesizing nanomaterials; a chamber that receives the precursor received in the receiver and includes a reaction zone in which the nanomaterials is formed in the precursor; and a feeder that is connected to the receiver and the chamber and receives the precursor from the receiver, and feeds the precursor into the chamber, wherein the feeder puts the precursor into the chamber along a length of the chamber.

The nanomaterial synthesizing apparatus according to an embodiment of the present disclosure can mass-produce the nanomaterials, reduce a production time thereof, and have a high output thereof.

Further, the nanomaterials synthesizing apparatus according to an embodiment of the present disclosure may stably synthesize the nanomaterials.

Further, the nanomaterial synthesizing apparatus according to an embodiment of the present disclosure can improve operation efficiency to reduce a feed rate of gas required for a process of putting the standalone precursor for synthesizing nanomaterials and a process of discharging the synthesized nanomaterials.

According to an embodiment of the present disclosure, the nanomaterials synthesizing apparatus provides a reaction gas to the aforementioned standalone precursor for synthesizing nanomaterials and produces the nanomaterials. In an embodiment, a reaction gas is fed to the standalone precursor for synthesizing nanomaterials, which makes it possible to produce boron nitride nanotube (BNNT).

Referring to FIG. 8, nanomaterials synthesizing apparatus 1000 according to an embodiment of the present disclosure may include a receiver 100, a feeder 200, a chamber 300, a discharger 400, and a storage 500.

According to an embodiment of the present disclosure, the receiver may receive one or more standalone precursors for synthesizing nanomaterials. In this case, when the reception portions are, as described above, formed in the standalone precursor for synthesizing nanomaterials, the standalone precursor for synthesizing nanomaterials may be received in the receiver through the reception portions. For example, when the reception portions are the receiving grooves, the receiving grooves may be fastened to fasteners provided to the receiver, and the standalone precursor for synthesizing nanomaterials can be received in the receiver. Further, when the reception portions are the receiving surfaces, the standalone precursors for synthesizing nanomaterials can be mutually stacked and received in the receiver.

According to an embodiment of the present disclosure, the receiver and the feeder may be connected to each other, and a gate may be provided between the receiver and the feeder. The gate can be opened and closed. As the gate is opened, the precursor received in the receiver may be fed to the feeder. In this time, the gate may be driven such that the precursor is fed from the receiver to the feeder one by one.

According to an embodiment of the present disclosure, the feeder may be provided at a front end of the chamber. The feeder may house one or more precursors. FIG. 8 illustrates that the feeder 200 houses one precursor 10, but the present disclosure is not limited thereto. For example, numerous precursors 10 may be housed in the feeder 200, and the housed precursors 10 may be moved in the feeder 200 and positioned in front of a pusher 210.

According to an embodiment of the present disclosure, the feeder may further include a pusher that puts the precursor received from the receiver into the chamber. Specifically, the pusher may put the precursors into the chamber one by one. More specifically, the pusher may continuously put the precursors into the chamber one by one. Referring to FIG. 8, the pusher 210 may be disposed to face a load port 310 of the chamber 300, and put the precursors 10 into the chamber 300 in a magazine-fed way. The feeder individually puts the precursors into the chamber in a magazine-fed way using the pusher, which makes it possible to put the precursor into the chamber at a higher speed than a method of putting the precursor using a reaction module in the related art.

According to an embodiment of the present disclosure, a buffer member may be provided at a portion of the pusher which comes into contact with the precursor. As the buffer member is provided to the pusher, it is possible to effectively prevent the precursor from being damaged or deformed in the process of putting the precursor into the chamber. As the buffer member, any buffer member used in the art may be used without limitation.

According to an embodiment of the present disclosure, the feeder may feed the precursors into the chamber in a row. Specifically, the feeder may continuously feed the precursors into the chamber in a row. Referring to FIG. 8, the precursor 10 may be continuously fed to the pusher 210 provided to the feeder 200, and the pusher 210 may continuously feed the precursor 10 into the chamber 300 in a row. For example, the pusher may put a first precursor into the chamber, a second precursor may be positioned at the pusher, and then the pusher may put the second precursor into the chamber. In this way, the feeder may continuously put N precursors into the chamber in a row (where N is an integer equal to or greater than 1, which is equally applied below). As a result, the nanomaterial synthesizing apparatus can stably and rapidly put the precursors into the chamber, and thus can mass-produce the nanomaterials at a higher speed.

According to an embodiment of the present disclosure, the feeder may include various shapes of lifts in order to continuously feed numerous precursors into the chamber. For example, when the feeder houses numerous precursors in a vertical direction, a lifts may be vertically moved to position the precursor in front of the pusher of the feeder. Further, when the feeder houses numerous precursors in a horizontal direction, a lift may be horizontally moved to position the precursor in front of the pusher of the feeder. Further, when the pushers are housed in the feeder on a cyclic orbit as in a windmill, a lift may be cyclically moved to position the precursor in front of the pusher of the feeder.

According to an embodiment of the present disclosure, the chamber may have a cylindrical shape, and receive the precursor received in the receiver. Hereinafter, the nanomaterials (e.g., BNNTs) may be formed into the precursor in the reaction zone.

Referring to FIG. 8, the chamber 300 may include a cylindrical transfer passage along which the precursors 10 put through the feeder 200 are transferred. A part of the transfer passage includes a reaction zone HZ in which the reaction gas is fed to the precursors 10 in order to grow the nanomaterials.

According to an embodiment of the present disclosure, the reaction zone is a region in which an appropriate temperature for a reaction can be maintained and to which the reaction gas is provided by a gas feed pipe (not illustrated). The gas feed pipe may be provided inside the chamber, or be connected to the chamber.

According to an embodiment of the present disclosure, the reaction gas may be a nitrogen-containing reaction gas, and thus a BNNT may be grown from a precursor structure. Specifically, the reaction gas fed to the chamber is not particularly limited, and not only nitrogen ($N_2$) or ammonia ($NH_3$) but also a gas mixture thereof may be used and fed to the chamber. Alternatively, hydrogen ($H_2$) may be additionally mixed for use.

According to an embodiment of the present disclosure, the reaction gas may be fed to the chamber at a rate of 10 to 1,000 sccm. If the reaction gas is fed at a rate less than 10 sccm, a fed amount of nitrogen atoms is small, which may degrade nitrification efficiency of boron. For this reason, a reaction needs to be performed for a long time. If the reaction gas is fed at a rate exceeding 1,000 sccm, a boron powder is ablated from the precursor due to a fast moving rate of the reaction gas, which may lower a production yield for BNNTs.

According to an embodiment of the present disclosure, heat treatment in the chamber may be performed within a temperature range of about 1,050 to about 1,500° C. for a time of about 0.5 to about 6 hours. An alumina pipe may be used as the chamber, but the chamber is not necessarily limited thereto, and may be made of a heat resistant material capable of withstanding a temperature up to about 1,500° C.

According to an embodiment of the present disclosure, the chamber may further include a load port which is connected to the feeder and through which the precursor is put, and a discharge port through which the precursor having completely reacted in the reaction zone is discharged. Specifically, the chamber may be connected to the feeder through the load port, and connected to the discharger through the discharge port. In this case, a gate may be installed on the load port and the discharge port, and separate the chamber from an environment of the feeder and an environment of the discharger.

According to an embodiment of the present disclosure, the nanomaterial synthesizing apparatus may further include a vacuum treatment part. The vacuum treatment part may be connected to the chamber and adjust a vacuum level inside the chamber. To this end, the vacuum treatment part may include a vacuum pump and a controller. The vacuum treatment part may be connected to the load port and/or the discharge port.

According to an embodiment of the present disclosure, the nanomaterials synthesizing apparatus may further include a temperature control part that is connected to the chamber. The temperature control part may include a heater that directly regulates a temperature inside the chamber, and a controller that controls the heater.

According to an embodiment of the present disclosure, the nanomaterial synthesizing apparatus may further include a discharger that is connected to the discharge port of the chamber and discharges the precursor, in which the nanomaterials are formed, from the chamber. Referring to FIG. 8, a precursor 10' having completed reacted in the chamber 300 may freely fall through a discharge port 320 of the chamber 300 and be housed in the discharger 400. In this case, a buffer member may be provided on a bottom surface of the discharger. As the buffer member is provided on the bottom surface of the discharger, the completely reacting precursor freely falling from the chamber can be effectively inhibited from being impaired, damaged, and deformed.

According to an embodiment of the present disclosure, the nanomaterial synthesizing apparatus may further include a storage that is connected to the discharger. A gate may be provided between the storage and the discharger. As the gate is opened, the completely reacting precursors housed in the discharger may be transferred to the storage. In this case, a buffer member may be provided on a bottom surface of the storage. When all the completely reacting precursors are transferred to the storage, the gate provided between the storage and the discharger may be closed, and the storage may be separated to collect the completely reacting precursors.

According to an embodiment of the present disclosure, the feeder, the chamber, and the discharger may be operated in an organically interlocked manner in order to continuously put the precursors into the chamber. Specifically, when N precursors having completely reacting in the chamber are transferred to the discharger, the feeder may put new N precursors into the chamber. In such a way, when the numerous precursors having received in the receiver are all transferred to the chamber, the feeder does not transfer the precursors to the chamber any more, and the operation thereof is terminated. As described above, in order to organically interlock the feeder, the chamber, and the discharger, the nanomaterial synthesizing apparatus may further include a control part.

Hereinafter, a process of continuously putting the precursors into the chamber will be described. In this case, the description will be focused on an embodiment in which the feeder puts the precursors into the chamber one by one.

First, after a temperature and a gas atmosphere inside the chamber are optimized, the precursors are moved into the chamber through the feeder. In this case, as the gate is provided between the chamber and the feeder, the precursors may be received in the chamber while an optimum atmosphere inside the chamber is maintained. A vacuum pump may be installed in the feeder. Thus, when the gate between the feeder and the chamber is opened, the vacuum pump is operated such that a reaction gas atmosphere and pressure of feeder and the chamber can be matched, the precursors are transferred from the feeder to the chamber through the pusher, and then the gate is closed.

When the gate is closed, an operation of positioning a new precursor in front of the pusher is performed, and the new precursor may be fed to the chamber by the aforementioned process. During this operation, the feeder uses the gate and the vacuum pump provided between the feeder and the chamber, thereby preventing the precursor from being contaminated and causing the inside of the feeder to be similar to the atmosphere of the chamber.

In this way, the precursors 10 may be transferred toward the discharger 400 in order as illustrated in FIG. 8, and the precursors 10 may be aligned in the chamber 300 in a line.

However, in another example, the precursors 10 may be aligned in the chamber 300 in multiple lines.

A process of driving the reaction zone for a set time, proving a reaction gas to the precursor located in the reaction zone, and growing boron nitride nanotubes (BNNTs) in the precursor may be performed in the chamber. In this process, a fed amount of the reaction gas may be adjusted such that a reaction with the reaction gas can be maintained to the utmost when the precursor is located in the center of the reaction zone.

Hereinafter, description will be focused on an embodiment in which the feeder continuously put the precursors into the chamber.

As described above, a plurality of precursors may be housed in the feeder, and the feeder may have a lift capable of continuously positioning the precursors in front of the pusher. As a result, whenever the precursor is transferred into the chamber, it is not necessary to open the gate provided between the receiver and the feeder every time and put a new precursor into the feeder from the receiver.

Afterwards, when the precursor is located in front of the pusher of the feeder, an operation in which the gate provided between the feeder and the chamber is opened is performed. When the precursor is fed to the chamber by the pusher, an operation in which the gate is closed is performed. Preferably, an operation in which the gate provided between the feeder and the chamber is closed may be performed after the precursors are continuously fed to the chamber by a predetermined number that is the number of precursors that can be housed in the chamber. As a result, one or more precursors may be housed in the chamber at the same time and react with the reaction gas.

Meanwhile, the discharger may perform, in reverse order, the operation in which the feeder transfers the precursor to the chamber in order to perform an operation of discharging the precursors from the chamber. The discharger may include a gate and a vacuum pump provided between the chamber and the discharger. The vacuum pump may be operated such that a reaction gas atmosphere and a pressure of the discharger and the chamber can be matched when the gate is opened, and the gate may be closed when the completely reacting precursors are transferred to the discharger.

When the gate provided between the chamber and the discharger is closed, the discharger is under a nitrogen atmosphere similar to the atmosphere using the vacuum pump. Then, the gate provided between the discharger and the storage is opened to transfer the completely reacting precursors to the storage. Afterwards, the discharger closes all the gates again, and makes the inside of the discharger similar to the atmosphere of the chamber.

According to this method, the completely reacting precursors can be sequentially transferred to the storage, and discharged to the outside.

When BNNTs are grown by heat-treating powder in a batch type generally used, a single reaction module is mounted, and then steps of temperature up-temperature maintenance-BN synthesis-BNNT growth-temperature down-room temperature cooling-reactant ablation of a heat treatment apparatus should be performed. Therefore, due to the single reaction module, there is a limitation to an amount of production at a time, and economical efficiency is difficult to secure due to an increase in cost caused by energy, time, or the like.

On the other hand, the nanomaterial synthesizing apparatus according to an embodiment of the present disclosure can, as described above, produce the BNNTs by a continuous in-line operation, and thus maximize a yield and productivity when the BNNTs are produced.

Hereinafter, to specifically describe the present disclosure, examples will be described in detail. However, the examples of the present disclosure may be deformed in various different ways, and it is not interpreted that the scope of the present disclosure is not limited to the examples to be described below. The examples of the present specification are provided to more completely describe the present disclosure to those having ordinary knowledge in the art.

Example 1

Production of Standalone Precursor for Synthesizing Nanomaterials

An amorphous boron powder that included impurities of Mg of about 3.5 wt % and had a mean particle size of 5 μm was mixed with $Fe_2O_3$ powder that had a mean particle size of about 40 nm as a metal oxide catalyst, thereby producing mixed powder. Afterwards, a process of uniformly mixing the mixed powder for 5 minutes using a sieve shaker was performed three times while releasing lumped powder, and the amorphous boron powder and the metal catalyst were uniformly mixed to produce a first powder. In this case, the first powder was made to include amorphous boron of about 4 g and $Fe_2O_3$ of about 0.4 g.

Afterwards, an air jet milling process (a feed rate of about 2.5 g/min, a feed pressure of about 100 psi, and a grinding pressure of about 80 psi) was performed twice, and the first powder was ground and nanosized with a supersonic flow, thereby producing a second powder.

Sucrose as a binder powder and azodicarbonamide (ADCA) as a foaming agent were prepared. Afterwards, some (about 15 wt %) of the prepared binder powder were mixed with the second powder, and were put into deionized (DI) water, and then a horn sonic process (a volt meter of about 130 V, an once process time of about 7 minutes, and a process number of frequencies of four times) was performed. A phenomenon of lumping power particles was prevented through a horn sonic process. Sputtering and agitating were performed between the horn sonic processes. Afterwards, all of the remaining binder powder and the foaming agent were put, and agitated at a rotation speed of about 300 rpm for about 30 minutes, thereby producing a dispersant solution. In this case, a weight ratio between the second powder, the binder powder, and the foaming agent included in the dispersant solution was about 1:2.5:0.2.

Afterwards, the produced dispersant solution was put into a cylindrical mold, and was heat-treated at about 230° C. for about 2 hours, thereby producing a standalone precursor having two receiving grooves. As in FIGS. 1B and 2A, a standalone precursor having a diameter d2 of 65 mm, a length of 250 mm, and a diameter d2' of the receiving groove of about 16 mm was produced.

Synthesis of Nanomaterial (BNNT)

BNNT that was a nanomaterial was synthesized from the standalone precursor using the nanomaterial synthesizing apparatus illustrated in FIG. 8.

Specifically, BNNT was obtained by putting the standalone precursor into a chamber, feeding nitrogen ($N_2$) and ammonia ($NH_3$) as reaction gases into the chamber at flow rates of about 200 sccm and about 300 sccm respectively, and performing heat treatment at a temperature of about 1,200° C. to 1,400° C. for 1.5 hours to 3 hours. In this case, the standalone precursor was continuously heat-treated by charging and discharging at regular intervals, and a reaction sample of average 60 g per one standalone precursor was obtained. Finally, BNNT of 720 g/day was obtained by charging and discharging average 12 standalone precursors per day.

Example 2

A standalone precursor for synthesizing nanomaterials was produced by the same method as in Example 1, with the exception of forming a plurality of through-holes having a diameter of 2 mm (Ø2) and spaced at intervals d1 and d1' of 10 mm as in FIGS. 5 and 6C, and a nanomaterial (BNNT) was synthesized.

Figure 9:
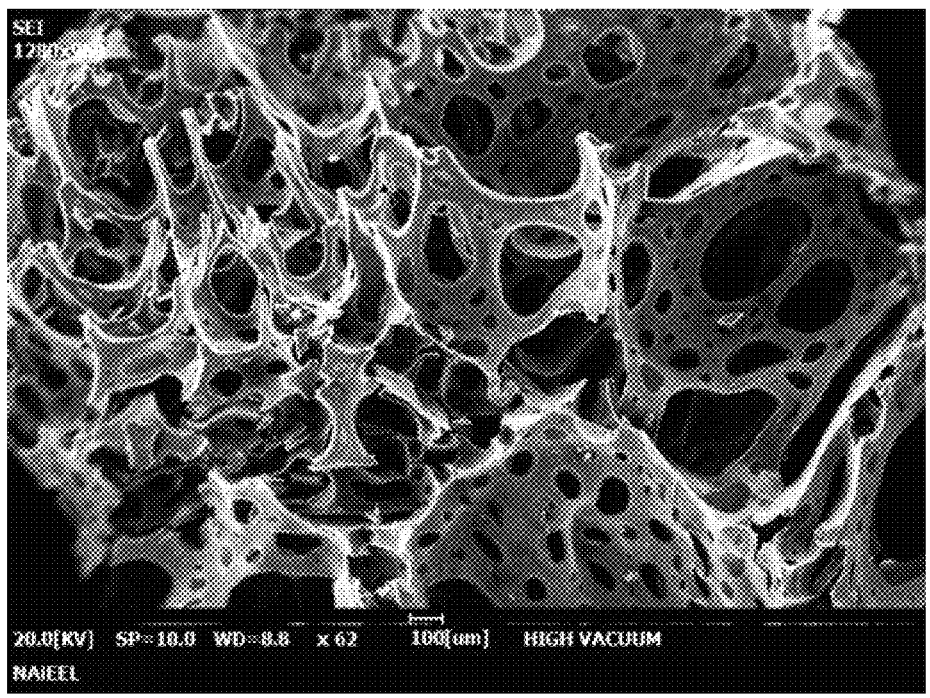
FIG. 9 is a SEM photograph before a reaction of a standalone precursor for synthesizing nanomaterials, which is produced in Example 1 of the present disclosure.
Figure 9:
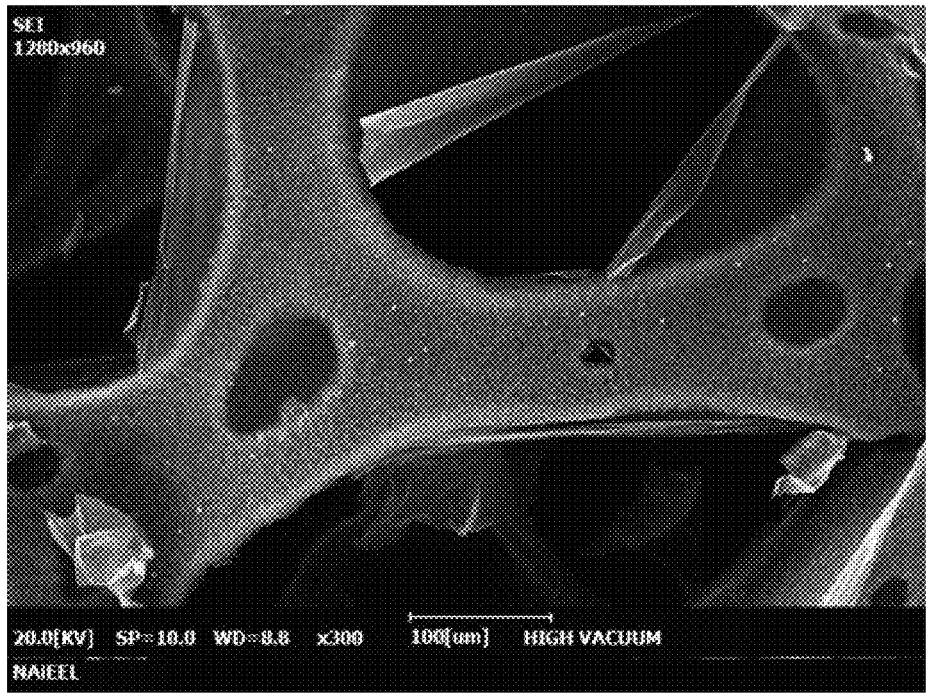
Figure 10:
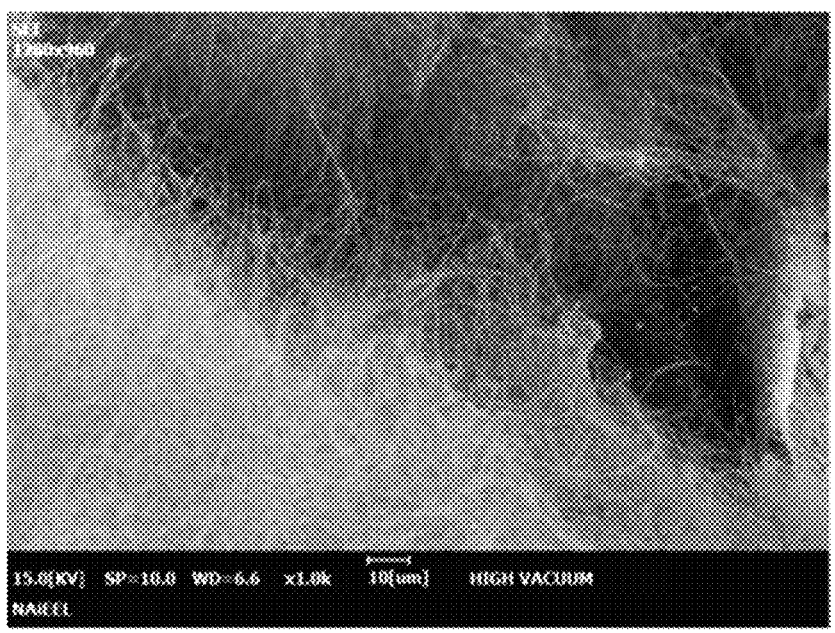
FIG. 10 is a SEM photograph after a reaction of a standalone precursor for synthesizing nanomaterials, which is produced in Example 1 of the present disclosure in which synthesis of nanomaterial (BNNT) is completed.
Figure 10:
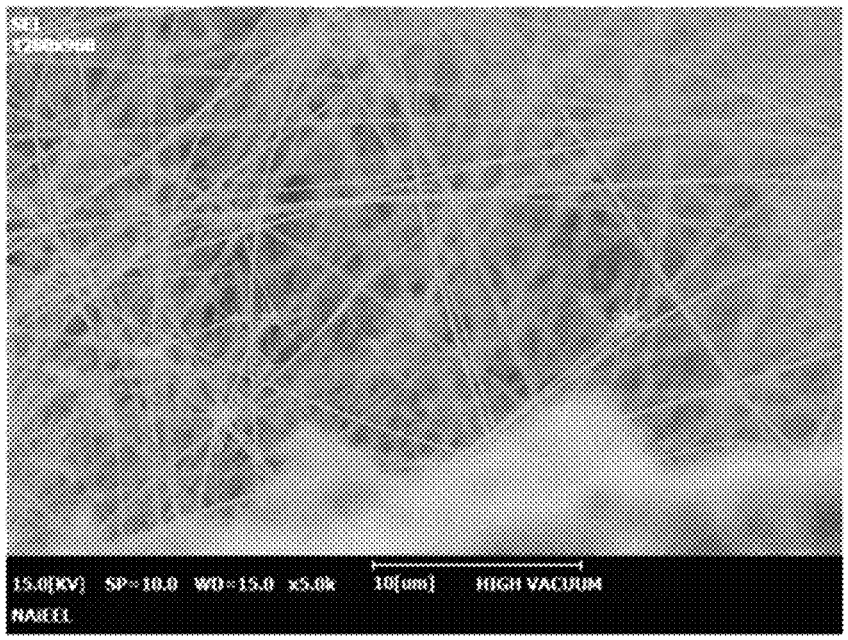

FIG. 9 is a SEM photograph before a reaction of a standalone precursor for synthesizing nanomaterials, which is produced in Example 1 of the present disclosure, and FIG. 10 is a SEM photograph after a reaction of a standalone precursor for synthesizing nanomaterials, which is produced in Example 1 of the present disclosure in which synthesis of nanomaterial (BNNT) is completed. Specifically, FIG. 9 is a SEM photograph a standalone precursor for synthesizing nanomaterials before being heat-treated in a chamber along with a reaction gas, and FIG. 10 is a SEM photograph a standalone precursor for synthesizing nanomaterials after being heat-treated in a chamber along with a reaction gas.

Referring to FIGS. 9 and 10, it can be found that the standalone precursor for synthesizing nanomaterials which was produced in Example 1 was heat-treated in a chamber along with a reaction gas, and BNNT was grown in the standalone precursor for synthesizing nanomaterials on the whole.

Figure 11:
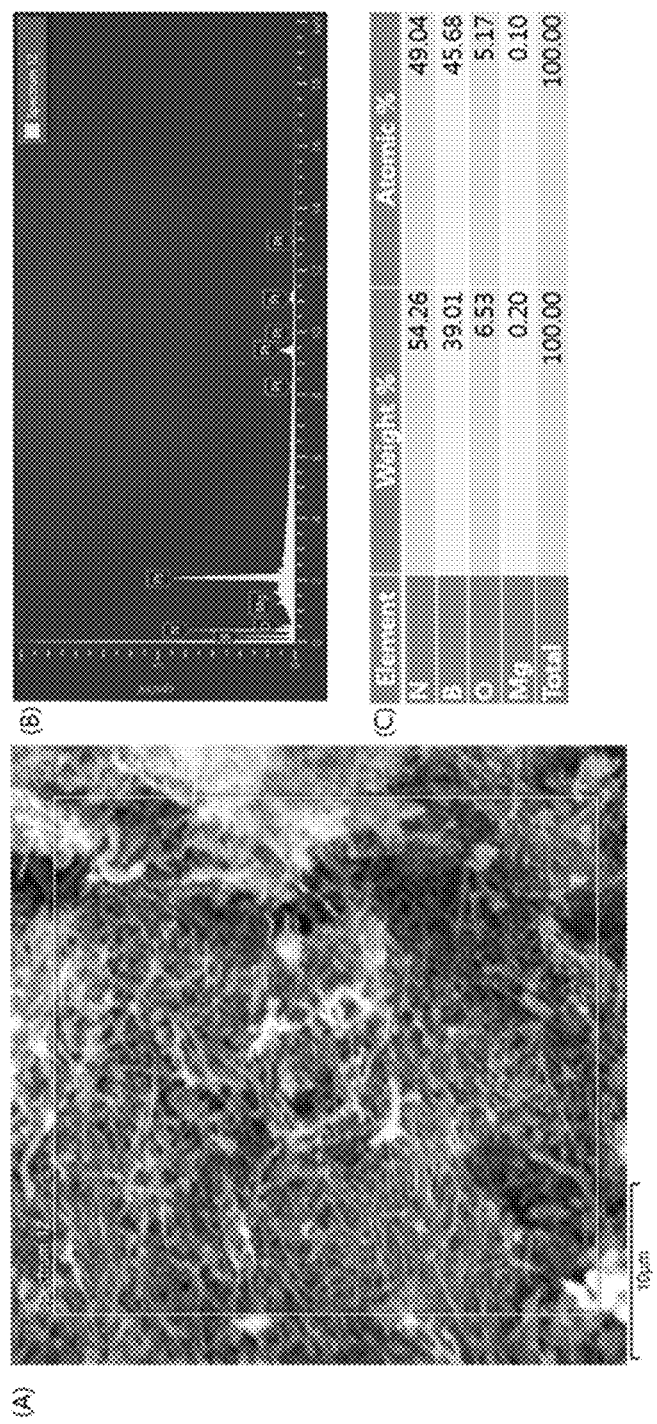
FIG. 11 is a SEM photograph and EDS analysis results after a reaction of a standalone precursor for synthesizing nanomaterials, which is produced in Example 1 of the present disclosure in which synthesis of nanomaterial (BNNT) is completed.

FIG. 11 shows a SEM photograph and EDS analysis results after a reaction of a standalone precursor for synthesizing nanomaterials, which is produced in Example 1 of the present disclosure in which synthesis of nanomaterial (BNNT) is completed. Specifically, FIG. 11A is a SEM photograph after a reaction of a standalone precursor for synthesizing nanomaterials, in which synthesis of BNNT is completed, FIG. 11B shows energy dispersive spectroscopy (EDS) results of a quadrilateral region indicated in FIG. 11A, and FIG. 11C is a table showing contents of components obtained through FIG. 11B.

Referring to FIG. 11, it can be found that a boron nitride nanotube in which an atomic ratio (at %) between nitrogen and boron was bout 1:1 was synthesized, and purity reaching about 95 at % was shown.

Figure 12:
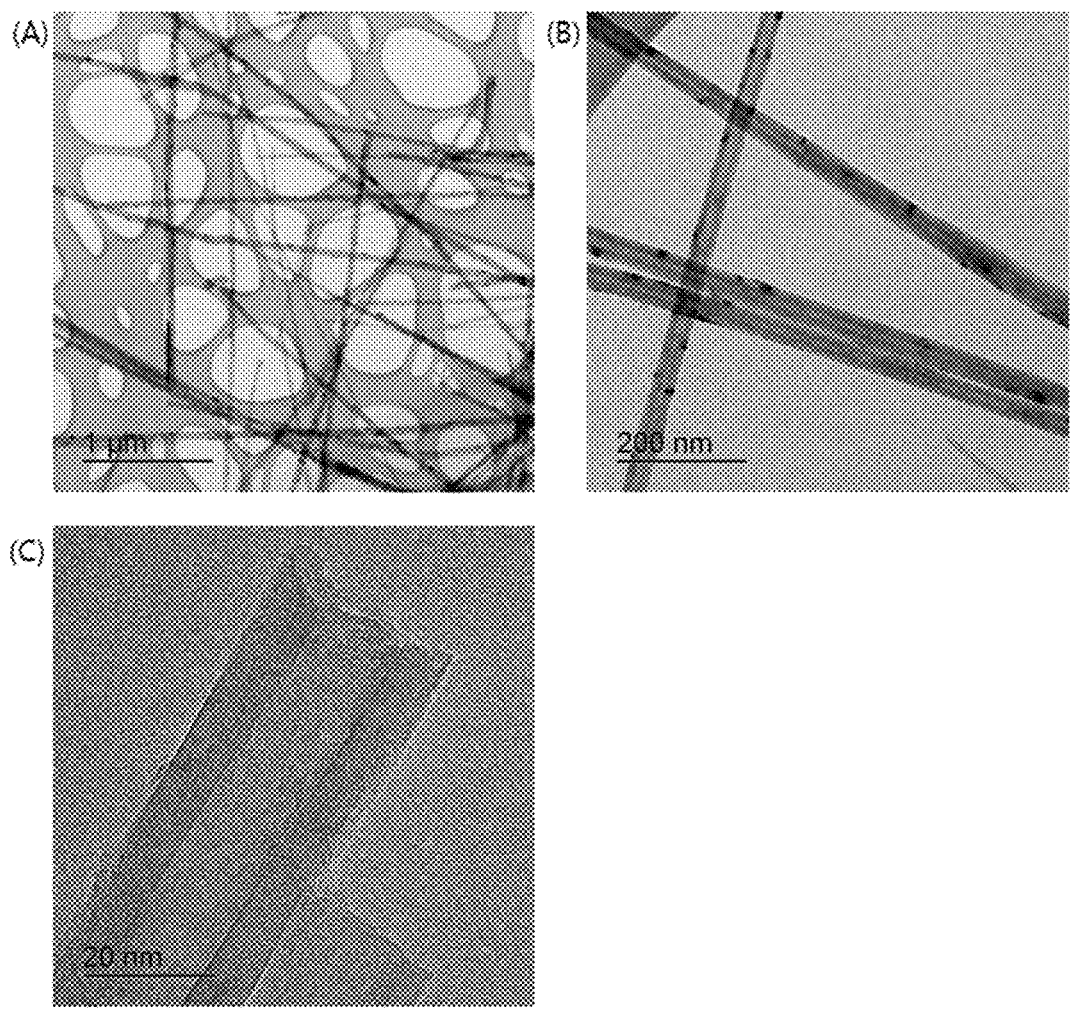
FIG. 12 is a TEM photograph of nanomaterial (BNNT) synthesized in Example 1 of the present disclosure.

FIG. 12 is a TEM photograph of nanomaterial (BNNT) that is synthesized in Example 1 of the present disclosure. Referring to FIG. 12, it can be found that a nanotube having an average diameter of about 50 nm or less was grown in a straight and long cylinder shape.

Figure 13:
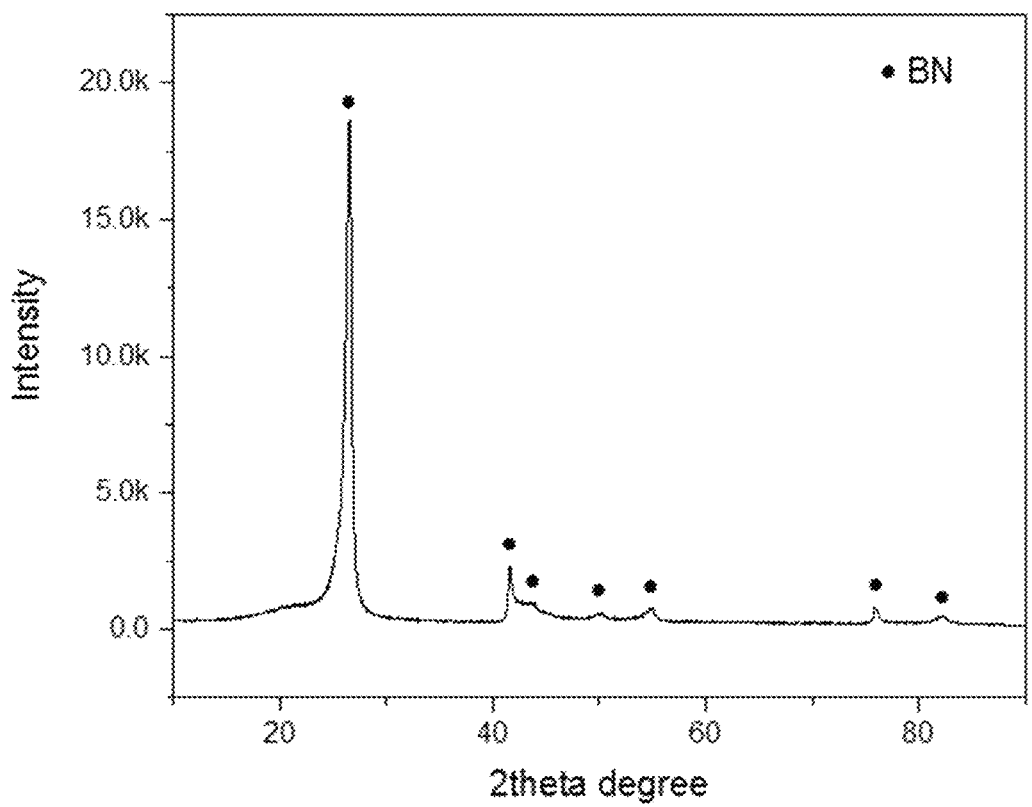
FIG. 13 is XRD data of nanomaterial (BNNT) synthesized in Example 1 of the present disclosure.

FIG. 13 is XRD data of nanomaterial (BNNT) that is synthesized in Example 1 of the present disclosure. Referring to FIG. 13, it can be found that (002) primary peak shown an hexagonal h-BN structure and so h-BN was synthesized.

Therefore, it can be found through the XRD and the EDS analysis that a compound having an h-BN structure was synthesized, and it can be found through the SEM and TEM photographs that the compound was a hollow nanotube and a reaction result was boron nitride nanotubes (BNNTs).

Comparative Example 1

Production of Precursor Powder for Synthesizing Nanomaterials

First and second powders were produced by the same method as in Example 1. A precursor powder for synthesizing nanomaterials was produced by preparing the same binder powder and foaming agent as in Example 1 and mixing the second powder, the binder powder, and the foaming agent at a weight ratio of about 1:2.5:0.2.

Synthesis of Nanomaterial (BNNT)

The produced precursor powder of 1 g for synthesizing nanomaterials was put into a crucible of standards having a length of 7 cm, a width of 1.5 cm, and a depth of 1 cm and was uniformly spread, and then was loaded onto the center of the reaction zone of the nanomaterial synthesizing apparatus illustrated in FIG. 8. Afterwards, BNNT that was a nanomaterial was synthesized in a once-a-day batch way using the precursor powder for synthesizing nanomaterials which was spread on the crucible.

Specifically, a reaction sample of 0.95 g was obtained by feeding nitrogen ($N_2$) and ammonia ($NH_3$) as reaction gases into the chamber at flow rates of about 200 sccm and about 300 sccm respectively, and performing heat treatment in a batch type at a temperature of about 1,200° C. to 1,400° C. for 3 hours. This was a synthesized product whose weight was increased by about 2.48 times as the binder powder and the foaming agent were changed into an evaporated substance of about 60% through a dissociation process in a synthesis process, weight of the precursor was reduced, nitrogen reacted on boron, and boron nitride was synthesized.

Comparative Example 2

Production of Disc Type Precursor for Synthesizing Nanomaterials (Reaction Module Mounting Type)

First and second powders were produced by the same method as in Example 1. A precursor dispersant solution for synthesizing nanomaterials was produced by preparing the same binder powder and foaming agent as in Example 1 and mixing the second powder, the binder powder, and the foaming agent at a weight ratio of about 1:2.5:0.2.

Afterwards, the produced precursor dispersant solution of 1 g for synthesizing nanomaterials was put into a mold having a diameter of 4 cm and a depth of 3 cm, was molded in the same process as in Example 1, and was molded into a disc having a diameter of 4 cm and a thickness of 0.5 cm. A hole having a diameter of 0.5 cm was drilled in the center of the molded disc, and numerous disc type precursors were fitted into a rod and were mounted on a reaction module.

Synthesis of Nanomaterial (BNNT)

BNNT that was a nanomaterial was synthesized by continuously charging and discharging the reaction module on which the disc type precursors were mounted into and from the nanomaterial synthesizing apparatus illustrated in FIG. 8.

Specifically, a reaction sample of average 15 g per one reaction module was obtained by feeding nitrogen ($N_2$) and ammonia ($NH_3$) as reaction gases into the chamber at flow rates of about 200 sccm and about 300 sccm respectively, and performing heat treatment at a temperature of about 1,200° C. to 1,400° C. while charging and discharging the reaction module on which the disc type precursors were mounted at intervals of 3 hours, and BNNT of 120 g/day was finally obtained by charging and discharging average 8 reaction modules per day.

TABLE 1

|  | Example 1 | Comparative Example 1 | Comparative Example 2 |
|---|---|---|---|
| 1-day precursor reaction unit (number/day) | 12 | 1 | 8 |
| 1-day BNNT output (g/day) | 720 | 0.95 | 120 |

Referring to Table 1, it was found that Example 1 obtained BNNT of 720 g/day and thus productivity of BNNT was improved about 750 times for the same time compared to Comparative Example 1 that obtained BNNT of 0.95 g/day, and about 6 times for the same time compared to Comparative Example 2 that obtained BNNT of 120 g/day.

What is claimed is:

1. A standalone precursor for synthesizing boron nitride nanotubes, the standalone precursor comprising:
   a pillar,
   wherein:
   pores are defined in the pillar;
   through-holes are defined in the pillar;
   a ratio of a diameter of the standalone precursor to a length of the standalone precursor is between 1:3 and 1:6, inclusive; and
   each of the through-holes extends continuously from a first opening on an outer surface of the standalone precursor to a second opening on the outer surface of the standalone precursor, the first opening being diametrically opposite to the second opening across the standalone precursor.

2. The standalone precursor of claim 1, further comprising a reception portion for allowing the standalone precursor to be received by a reception device, wherein the reception portion is defined along the length of the standalone precursor.

3. The standalone precursor of claim 2, wherein the reception portion includes at least one receiving groove which is: (i) defined on the standalone precursor; (ii) continuous along the length of the standalone precursor; and (iii) dented inward from the outer surface of the standalone precursor.

4. The standalone precursor of claim 2, wherein the reception portion includes at least one receiving surface that is flat along the length of the standalone precursor.

5. The standalone precursor of claim 1, wherein the through-holes are defined radially around a central axis of the standalone precursor.

6. The standalone precursor of claim 1, wherein the through-holes are spaced apart from each other along the length of the standalone precursor.

7. The standalone precursor of claim 1, wherein a cross-sectional shape of the standalone precursor is circular, semicircular, elliptical or polygonal.

8. The standalone precursor of claim 1, wherein the length of the standalone precursor is at least 200 mm and no more than 300 mm.

9. The standalone precursor of claim 1, wherein the pores are formed at a same time as the standalone precursor by heating a mold which contains a precursor dispersant solution comprising a foaming agent.

10. The standalone precursor of claim 1, wherein the standalone precursor is configured to be fed into a reaction chamber without being placed in a reaction module.

11. A method of forming the standalone precursor of claim 1, the method comprising:
    forming the standalone precursor at a same time as the pores by heating a mold which contains a precursor dispersant solution comprising a foaming agent.

12. A method of forming the standalone precursor of claim 1, the method comprising:
    forming the standalone precursor including feeding the standalone precursor into a reaction chamber without placing the standalone precursor in a reaction module.

* * * * *